US011377822B2

(12) United States Patent
Takahashi et al.

(10) Patent No.: US 11,377,822 B2
(45) Date of Patent: Jul. 5, 2022

(54) HYDRAULIC DRIVE APPARATUS

(71) Applicant: Hitachi Construction Machinery Co., Ltd., Tokyo (JP)

(72) Inventors: Kiwamu Takahashi, Moriyama (JP); Kouji Ishikawa, Kasumigaura (JP); Yasutaka Tsuruga, Ryugasaki (JP); Masatoshi Hoshino, Tsuchiura (JP); Seiji Hijikata, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 663 days.

(21) Appl. No.: 16/330,407

(22) PCT Filed: Sep. 8, 2017

(86) PCT No.: PCT/JP2017/032536
§ 371 (c)(1),
(2) Date: Mar. 5, 2019

(87) PCT Pub. No.: WO2019/049327
PCT Pub. Date: Mar. 14, 2019

(65) Prior Publication Data
US 2021/0340731 A1 Nov. 4, 2021

(51) Int. Cl.
*E02F 9/22* (2006.01)
(52) U.S. Cl.
CPC .......... *E02F 9/2296* (2013.01); *E02F 9/2235* (2013.01); *E02F 9/2292* (2013.01)
(58) Field of Classification Search
CPC .... F15B 2211/6652; F15B 2211/20553; E02F 9/2296; E02F 9/2292; E02F 9/2235
See application file for complete search history.

(56) References Cited

U.S. PATENT DOCUMENTS

| 6,183,210 B1 * | 2/2001 | Nakamura | ............ F04B 49/065 |
| | | | 417/222.1 |
| 2007/0205026 A1 * | 9/2007 | Lee | ........................ E02F 9/2253 |
| | | | 180/6.48 |

(Continued)

FOREIGN PATENT DOCUMENTS

| JP | 10-159807 A | 6/1998 |
| JP | 11-132202 A | 5/1999 |

(Continued)

OTHER PUBLICATIONS

International Search Report (PCT/ISA/210) issued in PCT Application No. PCT/JP2017/032536 dated Dec. 5, 2017 with English partial translation (five (5) pages).

(Continued)

*Primary Examiner* — Abiy Teka
(74) *Attorney, Agent, or Firm* — Crowell & Moring LLP

(57) ABSTRACT

A first torque control proportional electromagnetic valve (37) is connected through a first torque control line (41) to a third pressure receiving chamber (32D) in a first torque control regulator (32). A second torque control proportional electromagnetic valve (38) is connected through a second torque control line (42) to a third pressure receiving chamber (35D) in a second torque control regulator (35). The first and second torque control proportional electromagnetic valves (37, 38) are controlled by a controller 47. A switching valve (48) is provided between the first torque control line (41) and the second torque control line (42). The switching valve (48) supplies an output pressure of the first torque control proportional electromagnetic valve (37) to the third pressure receiving chamber (35D) in the second torque control regulator (35) at the time of driving hydraulic motors (2B, 2C) for left side and right side traveling.

4 Claims, 15 Drawing Sheets

(56) References Cited

U.S. PATENT DOCUMENTS

2008/0072588 A1*   3/2008   Ariga ................. E02F 9/2235
                                                                    60/449
2012/0285157 A1*  11/2012   Okano ................ E02F 9/2235
                                                                    60/445

FOREIGN PATENT DOCUMENTS

| JP | 2009-299288 A | 12/2009 |
| JP | 2010-70978 A | 4/2010 |
| JP | 2010-78047 A | 4/2010 |
| JP | 2010-78147 A | 4/2010 |
| JP | 2011-157790 A | 8/2011 |
| JP | 5778058 B2 * | 9/2015 |
| JP | 5778058 B2 | 9/2015 |

OTHER PUBLICATIONS

Japanese-language Written Opinion (PCT/ISA/237) issued in PCT Application No. PCT/JP2017/032536 dated Dec. 5, 2017 (four (4) pages).
Extended European Search Report issued in European Application No. 17922909.1 dated Mar. 18, 2020 (nine (9) pages).

* cited by examiner

HYDRAULIC DRIVE APPARATUS

TECHNICAL FIELD

The present invention relates to a hydraulic drive apparatus used in a working machine, such as a hydraulic excavator.

BACKGROUND ART

A working machine (construction machine) which is a representative example of a hydraulic excavator is provided thereon with a hydraulic drive apparatus equipped with two or more displacement variable hydraulic pumps for driving a plurality of hydraulic actuators. In this case, a flow rate or torque of each of the hydraulic pumps is individually controlled, thereby making it possible to improve workability and efficiency of the hydraulic excavator.

For example, Patent Document 1 discloses a hydraulic circuit device of a working machine such as a hydraulic excavator. The hydraulic circuit device calculates an allowance torque of each of the hydraulic pumps with a controller, from an operating amount of each of a plurality of operating levers for operating each of hydraulic actuators, a delivery pressure of each of a plurality of displacement variable hydraulic pumps for driving each of the hydraulic actuators, and the like. The controller controls input to an electromagnetic proportional control valve provided in a regulator of each of the hydraulic pumps based upon the calculated allowance torque. According to the hydraulic circuit device, since the torque is distributed to each of the hydraulic pumps in accordance with the operating amount of each of the operating levers, there is a possibility of being capable of improving workability and a working efficiency.

Meanwhile, Patent Document 2 discloses a pump control device for a construction machine such as a hydraulic excavator. The pump control device is configured to be capable of setting torque of two hydraulic pumps individually, and is provided with detecting means configured to detect a delivery pressure of the hydraulic pump for revolving drive to limit the torque of the hydraulic pump for revolving drive in accordance with the delivery pressure. According to this pump control device, the two hydraulic pumps are controlled as follows at the time of performing a compound operation composed of a revolving operation, a boom-raising operation and the like, that is, performing a revolving compound operation of simultaneously performing a plurality of hydraulic actuators.

That is, the two hydraulic pumps are controlled such that at the revolving activation time, the torque of one hydraulic pump for revolving drive is limited, and torque acquired by subtracting the torque of the one hydraulic pump from torque allowable to the two hydraulic pumps is given to the other hydraulic pump. According to such a pump control device, a relief flow rate from a relief valve provided in a revolving hydraulic motor is reduced, thus making it possible to reduce an energy loss at the revolving activation time. Along with this, a speed of the hydraulic actuator other than the revolving hydraulic motor in the revolving compound operation can be increased to improve compound operability and working efficiency.

PRIOR ART DOCUMENT

Patent Document

Patent Document 1: Japanese Patent Laid-Open No. 10-159807 A

Patent Document 2: Japanese Patent Laid-Open No. 2011-157790 A

SUMMARY OF THE INVENTION

Incidentally, a working machine such as a hydraulic excavator is provided with hydraulic motors for left side and right side traveling, and in many cases the hydraulic motors for left side and right side traveling are respectively driven by different hydraulic pumps. FIG. 15 shows a hydraulic circuit according to a comparative example. A hydraulic motor 2C for right side traveling is driven by a first main hydraulic pump 14, and a hydraulic motor 2B for left side traveling is driven by a second main hydraulic pump 15. In this case, the hydraulic circuit is provided with a first torque control proportional electromagnetic valve 37 for performing torque control of the first main hydraulic pump 14 and a second torque control proportional electromagnetic valve 38 for performing torque control of the second main hydraulic pump 15. In addition, the hydraulic circuit is provided with a first flow rate control proportional electromagnetic valve 39 for performing flow rate control of the first main hydraulic pump 14 and a second flow rate control proportional electromagnetic valve 40 for performing flow rate control of the second main hydraulic pump 15.

In Patent Document 1 and Patent Document 2 as described above, the torque control proportional electromagnetic valve only is shown. On the other hand, the comparative example as shown in FIG. 15 is provided with not only the torque control proportional electromagnetic valves 37, 38 but also flow rate control proportional electromagnetic valves 39, 40 for controlling the maximum tilting of the main hydraulic pumps 14, 15, that is, a pump flow rate thereof. The output of each of the proportional electromagnetic valves 37, 38, 39, 40 is controllable by a controller 47. In addition, a pressure sensor 46 for travel operation detection is connected to the controller 47 to detect operations of lever/pedal operating devices 8A, 8B for left side and right side traveling.

Here, in the middle of traveling straight by both of the hydraulic motor 2B for left side traveling and the hydraulic motor 2C for right side traveling, it is not preferable for the hydraulic excavator to mistrack due to a difference in rotational amount between both the hydraulic motors 2B, 2C. Therefore, it is considered that the controller 47 is in advance programmed to be capable of suppressing the hydraulic excavator from mistracking in this manner. For example, when the travel operation is detected by the pressure sensor 46 for travel operation detection, it is considered that the controller 47 outputs the same command value to both of the first torque control proportional electromagnetic valve 37 and the second torque control proportional electromagnetic valve 38, and outputs the same command value to both of the first flow rate control proportional electromagnetic valve 39 and the second flow rate control proportional electromagnetic valve 40.

As shown in FIG. 14, however, a proportional electromagnetic valve used in control of torque or maximum tilting of a displacement variable main hydraulic pump possibly creates an individual difference (so-called variations) in an output characteristic of current to pressure. That is, as seen from FIG. 14 that shows characteristics of two proportional electromagnetic valves with a characteristic line A and a characteristic line B, even when the same current value $Ic\_tr$ is given to the two proportional electromagnetic valves, there is a possibility that the output pressure in one proportional electromagnetic valve becomes $Pc1$ and the output pressure in the other proportional electromagnetic valve becomes Pc2. Therefore, for example, even when the same command value is outputted to both of the torque control proportional electromagnetic valves 37, 38 from the controller 47, a difference between output of one torque control proportional electromagnetic valve 37 and output of the other torque control proportional electromagnetic valve 38 possibly occurs. In addition, even when the same command value is outputted to both of the flow rate control proportional electromagnetic valves 39, 40 from the controller 47, a difference between output of one flow rate control proportional electromagnetic valve 39 and output of the other flow rate control proportional electromagnetic valve 40 possibly occurs.

That is, due to variations in characteristics of the torque control proportional electromagnetic valves 37, 38, a difference between a control pressure of torque control of the first main hydraulic pump 14 that drives the hydraulic motor 2C for right side traveling and a control pressure of torque control of the second main hydraulic pump 15 that drives the hydraulic motor 2B for left side traveling possibly occurs. Likewise, due to variations in characteristics of the flow rate control proportional electromagnetic valves 39, 40, a difference between a control pressure of flow rate control of the first main hydraulic pump 14 that drives the hydraulic motor 2C for right side traveling and a control pressure of flow rate control of the second main hydraulic pump 15 that drives the hydraulic motor 2B for left side traveling possibly occurs.

Consequently, as shown in (X) in FIG. 12 and in (X) in FIG. 13, a difference between a delivery flow rate of the first main hydraulic pump 14 (that is, a flow rate of pressurized oil to be supplied to the hydraulic motor 2C for right side traveling) and a delivery flow rate of the second main hydraulic pump 15 (that is, a flow rate of pressurized oil to be supplied to the hydraulic motor 2B for left side traveling) possibly occurs. As a result, in a case of performing the straight travel operation of each of the lever/pedal operating devices 8A, 8B for left side and right side traveling (the same amount operation, for example, a full operation of each of the lever/pedals for both left side and right side), the hydraulic excavator mistracks against an intent of an operator, creating a possibility that the operability degrades.

An object of the present invention is to provide a hydraulic drive apparatus that can suppress a working machine from mistracking at the straight travel time in a high dimension.

A hydraulic drive apparatus according to the present invention comprises a displacement variable first hydraulic pump that includes a first displacement variable part and delivers pressurized oil to a plurality of hydraulic actuators including one traveling hydraulic motor, a first tilting actuator that drives the first displacement variable part to increase/decrease a delivery amount of the pressurized oil to be delivered from the first hydraulic pump, a first regulator that variably controls a control pressure that is supplied to/discharged from the first tilting actuator, a first proportional electromagnetic valve that is connected through a first oil passage to a pressure receiving chamber of the first regulator and supplies an output pressure to the pressure receiving chamber of the first regulator, a displacement variable second hydraulic pump that includes a second displacement variable part and delivers pressurized oil to a plurality of hydraulic actuators including the other traveling hydraulic motor, a second tilting actuator that drives the second displacement variable part to increase/decrease a delivery amount of the pressurized oil to be delivered from the second hydraulic pump, a second regulator that variably controls a control pressure that is supplied to/discharged from the second tilting actuator, a second proportional electromagnetic valve that is connected through a second oil passage to a pressure receiving chamber of the second regulator and supplies an output pressure to the pressure receiving chamber of the second regulator, and a controller configured to control the first proportional electromagnetic valve and the second proportional electromagnetic valve, further comprising a switching valve that supplies the output pressure of the first proportional electromagnetic valve to the pressure receiving chamber of the second regulator at the time of driving at least any one of the one traveling hydraulic motor and the other traveling hydraulic motor.

According to the present invention, it is possible to suppress the mistracking at the straight traveling in a high dimension. That is, at the traveling by the one traveling hydraulic motor and the other traveling hydraulic motor, it is possible to supply the output pressure of the first proportional electromagnetic valve to both of the first regulator of the first hydraulic pump and the second regulator of the second hydraulic pump by the switching valve. Thereby, the same pressure (command pressure) can be led to both of the first regulator and the second regulator. Therefore, even if there is a difference between the output of the first proportional electromagnetic valve and the output of the second proportional electromagnetic valve due to the individual difference (variation), it is possible to suppress the difference between the delivery flow rate of the first hydraulic pump and the delivery flow rate of the second hydraulic pump from occurring. As a result, it is possible to suppress the mistracking at the straight traveling in the high dimension at the straight traveling by the one traveling hydraulic motor that is driven by the first hydraulic pump and the other traveling hydraulic motor that is driven by the second hydraulic pump.

MODE FOR CARRYING OUT THE INVENTION

Hereinafter, hydraulic drive apparatuses according to embodiments of the present invention will be in detail explained referring to the accompanying drawings by taking a case of being applied to a hydraulic drive apparatus in a hydraulic excavator as a representative example of a working machine (construction machine), as an example.

Figure 1:
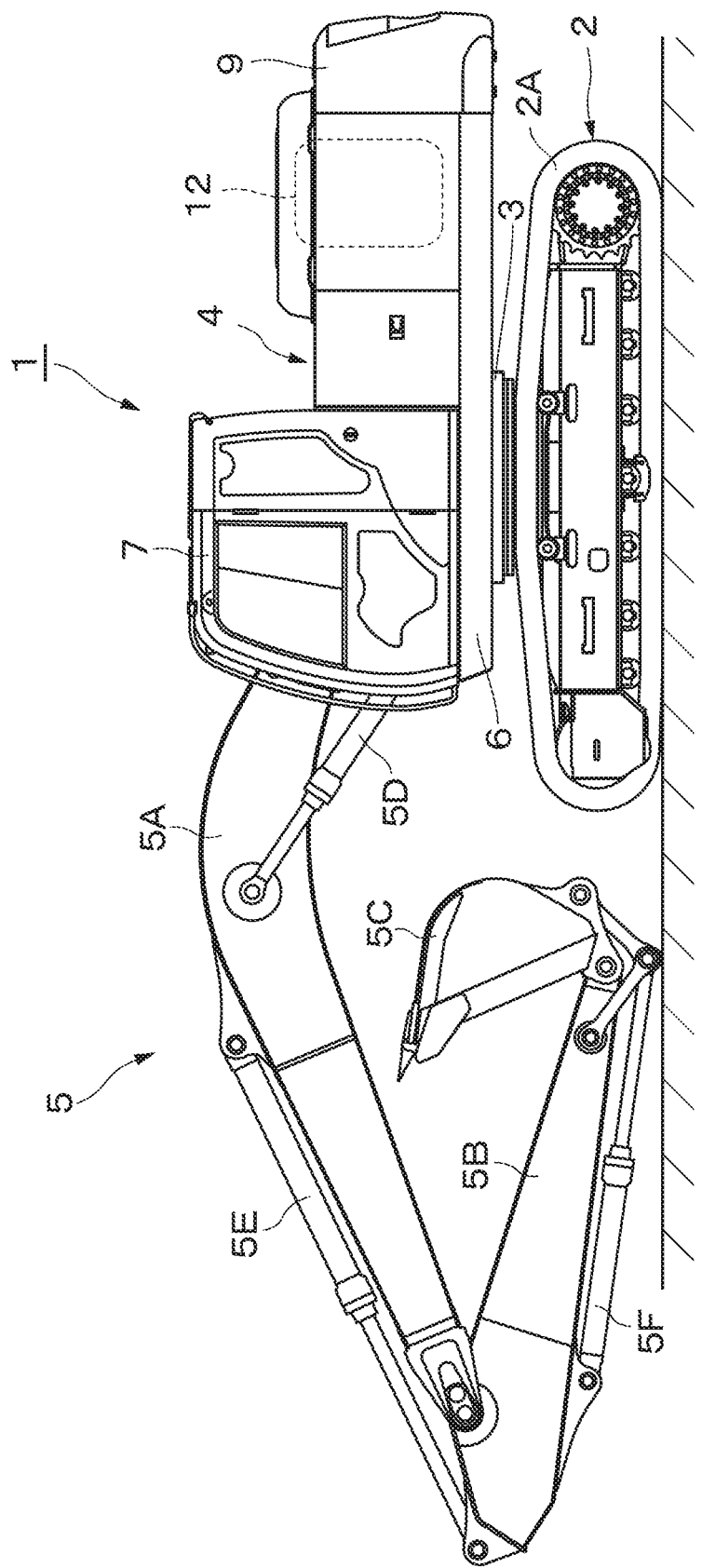
FIG. 1 is a front view showing a hydraulic excavator according to an embodiment.

FIG. 1 to FIG. 5 show a first embodiment. In FIG. 1, a hydraulic excavator 1 as a working machine is configured by a lower traveling structure 2 of crawler type that is capable of self-propelling, a revolving device 3 that is provided on the lower traveling structure 2, an upper revolving structure 4 that is mounted on the lower traveling structure 2 to be capable of revolving thereon through the revolving device 3 and a working mechanism 5 having a multi-joint structure that is provided in a front side of the upper revolving structure 4 and performs an excavating work of sand and earth or the like. In this case, the lower traveling structure 2 and the upper revolving structure 4 configure a vehicle body of the hydraulic excavator 1.

The lower traveling structure 2 is configured by a crawler belt 2A and hydraulic motors 2B, 2C for left side and right side traveling (refer to FIG. 2 and FIG. 3) that enable the hydraulic excavator 1 to travel by moving the crawler belt 2A around the lower traveling structure. The lower traveling structure 2 travels with the upper revolving structure 4 and the working mechanism 5 with rotation of the hydraulic motors 2B, 2C for left side and right side traveling by pressurized oil from the main hydraulic pumps 14, 15 (refer to FIG. 2 to FIG. 4) to be described later.

The working mechanism 5 called a working machine or a front as well includes, for example, a boom 5A, an arm 5B and a bucket 5C as a working tool, a boom cylinder 5D, an arm cylinder 5E and a bucket cylinder (working tool cylinder) 5F, which drive (swing) them. Further, the working mechanism 5 also includes an attachment cylinder 5G (refer to FIG. 2 and FIG. 3) for driving an attachment (working tool) as needed. The working mechanism 5 is operable (tilts/lifts, swings and drives) with expansion or contraction of the cylinders 5D, 5E, 5F, 5G as hydraulic cylinders based upon delivery of pressurized oil from the main hydraulic pumps 14, 15.

The upper revolving structure 4 is mounted on the lower traveling structure 2 through the revolving device 3 configured to include a revolving hydraulic motor 3A (refer to FIG. 2 and FIG. 3), a reduction gear mechanism, revolving bearings and the like. The upper revolving structure 4 revolves with the working mechanism 5 on the lower traveling structure 2 with rotation of the revolving hydraulic motor 3A as a hydraulic motor based upon delivery of pressurized oil from the main hydraulic pump 15.

The upper revolving structure 4 is configured by a revolving frame 6 as a support structure (base frame) of the upper revolving structure 4, a cab 7 and a counterweight 9 that are mounted on the revolving frame 6, and the like. In this case, an engine 12, a pump device 13, a control valve device 28, proportional electromagnetic valves 37, 38, 39, 40 and the like (refer to FIG. 2 to FIG. 5), which will be described later, are mounted on the revolving frame 6.

Figure 2:
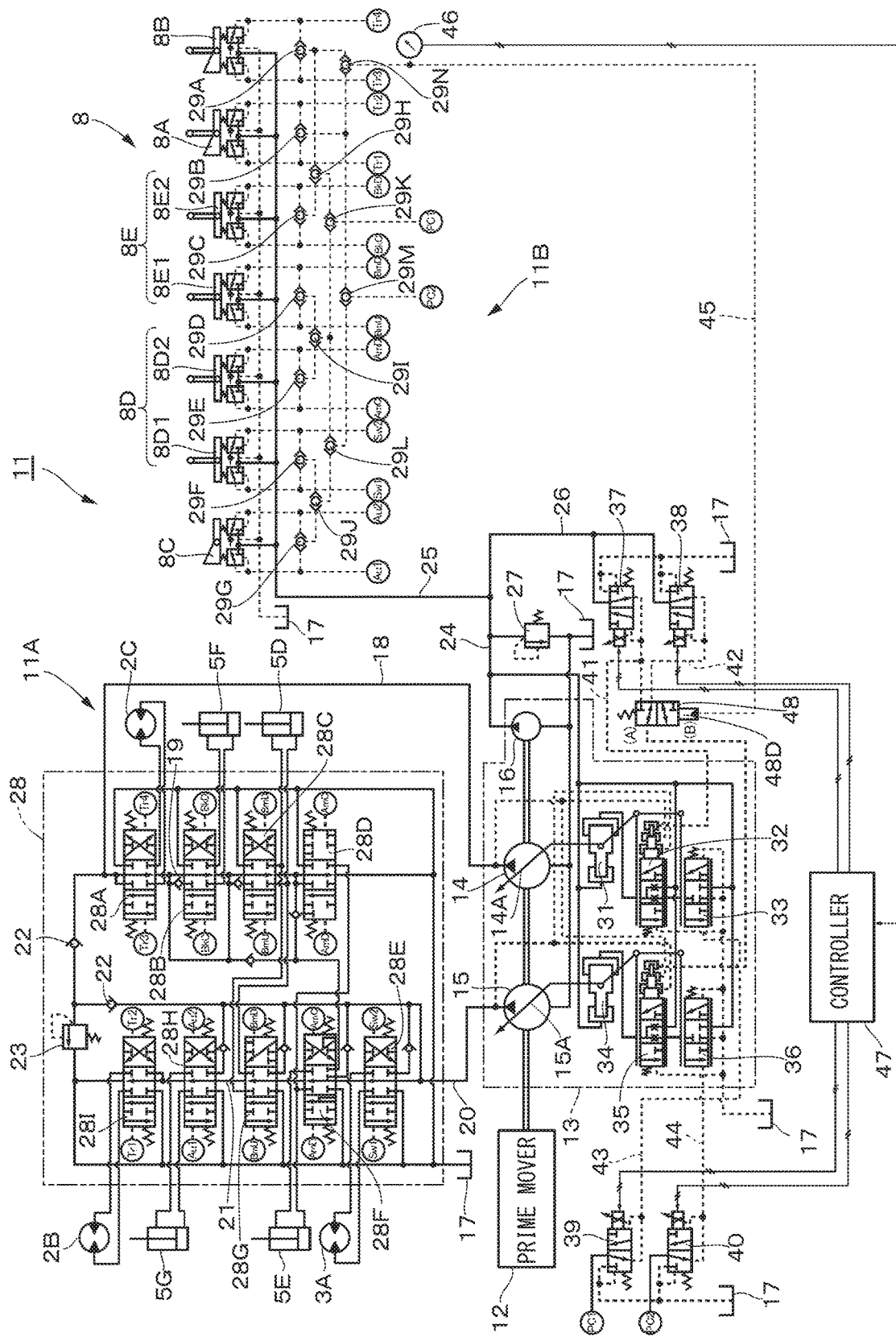
FIG. 2 is a hydraulic circuit diagram of a hydraulic excavator according to a first embodiment.
Figure 3:
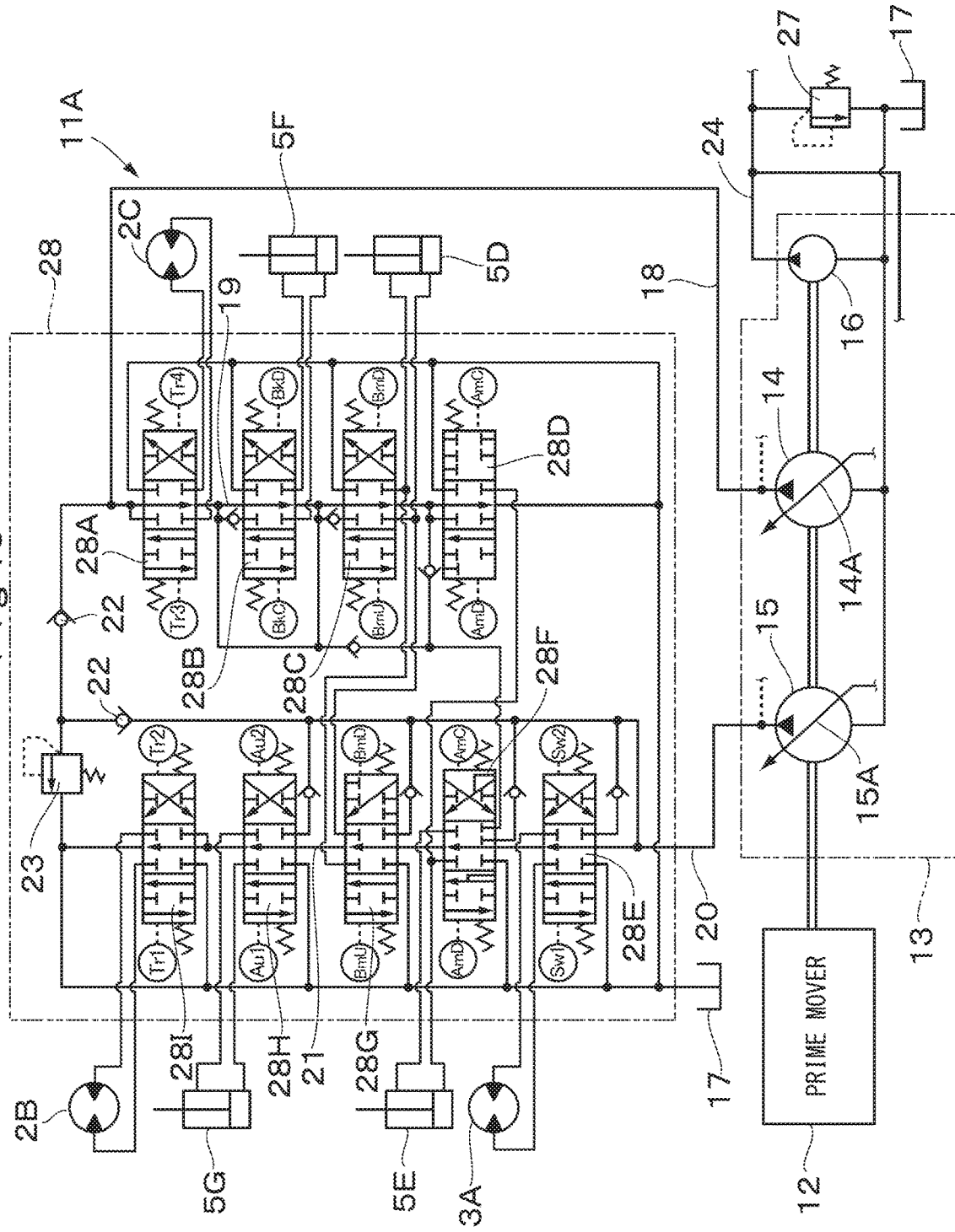
FIG. 3 is an enlarged hydraulic circuit diagram showing a main hydraulic circuit in FIG. 2.
Figure 4:
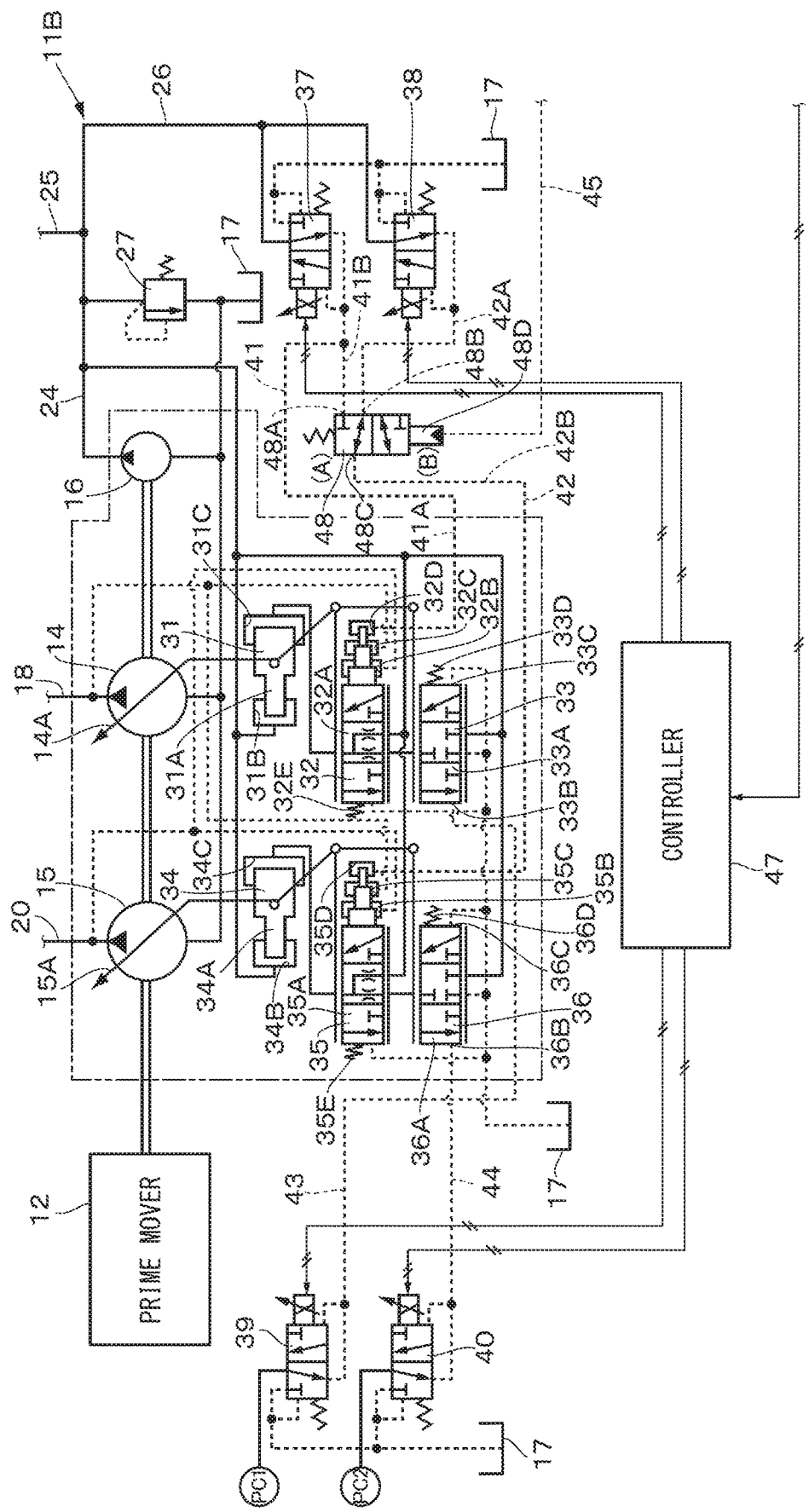
FIG. 4 is an enlarged hydraulic circuit diagram showing a hydraulic drive apparatus in FIG. 2.
Figure 5:
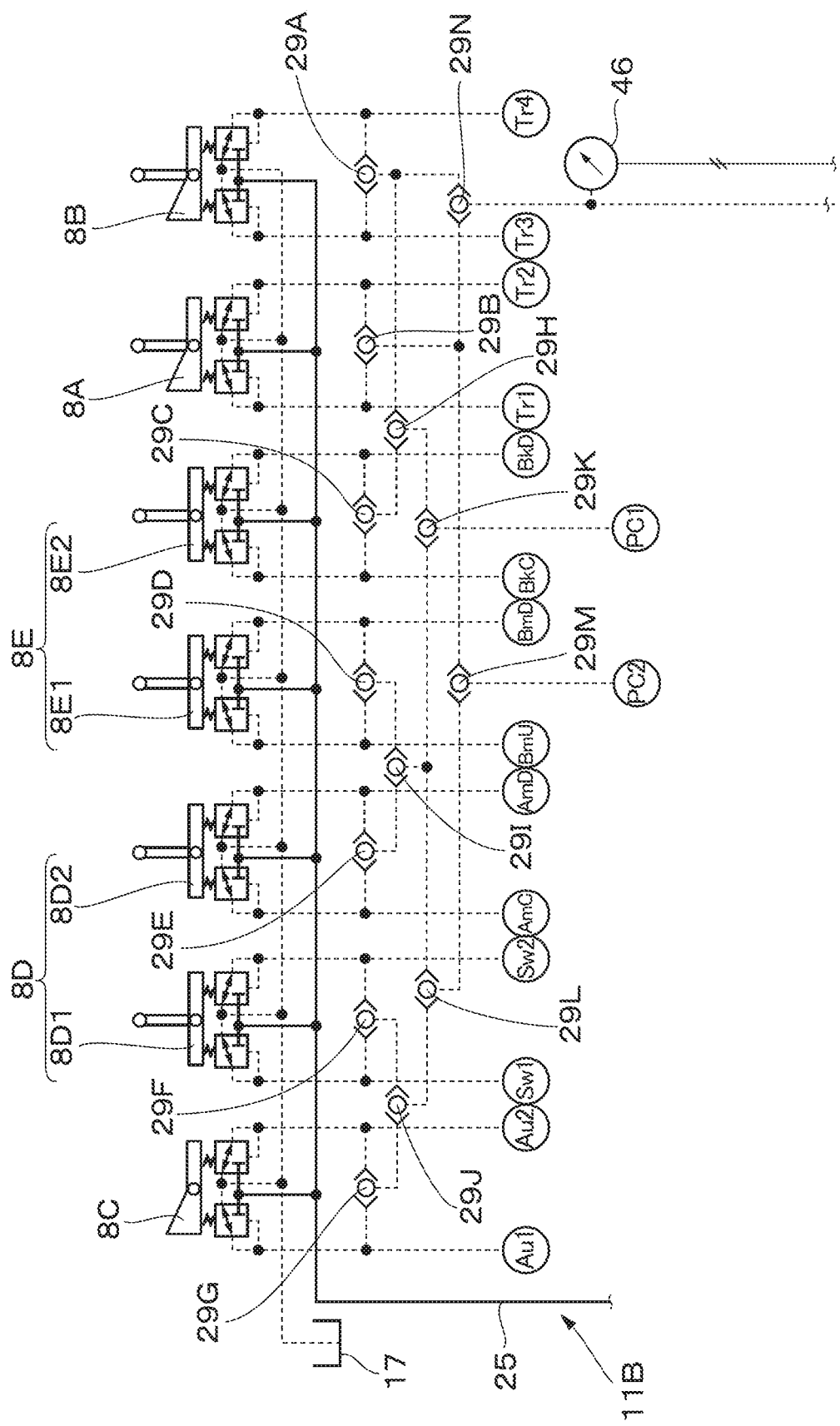
FIG. 5 is an enlarged hydraulic circuit diagram showing a pilot hydraulic circuit in FIG. 2.

The revolving frame 6 is attached through the revolving device 3 to the lower traveling structure 2. The cab 7 the inside of which serves as an operator's room is provided in a front part left side of the revolving frame 6. An operator's seat (not shown) on which an operator is seated is provided inside the cab 7. An operating device 8 is provided in the periphery of the operator's seat to operate the hydraulic excavator 1. As shown in FIG. 2 and FIG. 5 to be described later, the operating device 8 is configured by, for example, lever/pedal operating devices 8A, 8B for left side and right side traveling, a pedal operating device 8C for attachment, which are provided in front of the operator's seat and lever operating devices 8D, 8E for left side and right side working, which are provided respectively in both of left and right sides of the operator's seat.

The lever operating device 8D for left side working includes a lever operating device 8D1 for revolving and a lever operating device 8D2 for arm. In this case, the lever operating device 8D1 for revolving responds to an operation of the lever operating device 8D for left side working in a front-rear direction, and the lever operating device 8D2 for arm responds to an operation of the lever operating device 8D for left side working in a left-right direction. The lever operating device 8E for right side working includes a lever operating device 8E1 for boom and a lever operating device 8E2 for bucket. In this case, the lever operating device 8E1 for boom responds to an operation of the lever operating device 8E for right side working in a front-rear direction, and the lever operating device 8E2 for bucket responds to an operation of the lever operating device 8E for right side working in a left-right direction.

The lever/pedal operating devices 8A, 8B for left side and right side traveling are operated by an operator at the time of making the lower traveling structure 2 travel. The lever operating devices 8D, 8E for left side and right side working and the pedal operating device 8C for attachment are operated by an operator at the time of operating the working mechanism 5 and revolving the upper revolving structure 4. The operating devices 8A, 8B, 8C, 8D1, 8D2, 8E1, 8E2 (hereinafter, called the respective operating devices 8A to 8E2 as well) output pilot signals (pilot pressures) in response to operations (a lever operation and a pedal operation) of an operator to a control valve device 28 composed of a plurality of directional control valves 28A to 28I. Thereby, an operator can operate (drive) the hydraulic motors 2B, 2C for traveling, the cylinders 5D, 5E, 5F, 5G of the working mechanism 5 and the hydraulic actuator motor 3A for revolving in the revolving device 3.

The after-mentioned controller 47 (refer to FIG. 2 and FIG. 4) is provided in the inside of the cab 7 to be positioned in a backward and lower side of the operator's seat. Meanwhile, the counterweight 9 is provided in a rear end side of the revolving frame 6 to act as weight balance to the working mechanism 5.

Next, an explanation will be made of the hydraulic drive apparatus for driving the hydraulic excavator 1 with reference to FIG. 1, and further, FIG. 2 to FIG. 5 as well.

The hydraulic excavator 1 is provided with a hydraulic circuit 11 that operates (drives) the hydraulic excavator 1 based upon the pressurized oil delivered from the main hydraulic pumps 14, 15. Specifically, the hydraulic circuit 11 includes a main hydraulic circuit 11A including hydraulic actuators (the hydraulic motor 2B for left side traveling, hydraulic motor 2C for right side traveling, revolving hydraulic motor 3A, boom cylinder 5D, arm cylinder 5E, bucket cylinder 5F and attachment cylinder 5G), and a pilot hydraulic circuit 11B for operating the hydraulic actuators 2B, 2C, 3A, 5D, 5E, 5F, 5G (hereinafter, called the respective hydraulic actuators 2B to 5G as well). The hydraulic circuit 11 is configured by including the hydraulic actuators 2B to 5G, the engine 12 as a prime mover (drive source), the pump device 13, the control valve device 28, the operating device 8, the proportional electromagnetic valves 37, 38, 39, 40, the controller 47 and the switching valve 48.

The engine 12 is mounted on the revolving frame 6. The engine 12 is configured of, for example, an internal combustion engine such as a diesel engine. The first and second main hydraulic pumps 14, 15 configuring the pump device 13 and a pilot hydraulic pump 16 are attached to an output side of the engine 12. The hydraulic pumps 14, 15, 16 are driven and rotated by the engine 12. A drive source (power source) for driving the hydraulic pumps 14, 15, 16 can be configured by an engine 12 itself as the internal combustion engine, and besides, may be configured, for example, by an engine and an electric motor or an electric motor as a single unit.

The pump device 13 is configured by including the first main hydraulic pump 14 as a first hydraulic pump, the second main hydraulic pump 15 as a second hydraulic pump, the pilot hydraulic pump 16 and a hydraulic oil tank 17. The main hydraulic pumps 14, 15 and the pilot hydraulic pump 16 are connected mechanically to the engine 12, and are driven by the engine 12. The first main hydraulic pump 14 and the second main hydraulic pump 15 each are configured by, for example, a displacement variable hydraulic pump, more specifically by a swash plate, bent axis or radial piston hydraulic pump of a displacement variable type. In this case, the first main hydraulic pump 14 has a first displacement variable part 14A adjusting a delivery flow rate (pump displacement). The second main hydraulic pump 15 has a second displacement variable part 15A adjusting a delivery flow rate (pump displacement). The displacement variable parts 14A, 15A each correspond to a swash plate in the swash plate hydraulic pump in the displacement variable type and correspond to a valve plate in the bent axis hydraulic pump in the displacement variable type.

The first main hydraulic pump 14 and the second main hydraulic pump 15 are connected through the control valve device 28 to the respective hydraulic actuators 2B to 5G. In this case, the first main hydraulic pump 14 delivers the hydraulic oil stored in the hydraulic oil tank 17 to a first main delivery line 18 as pressurized oil. The second main hydraulic pump 15 delivers the hydraulic oil stored in the hydraulic oil tank 17 to a second main delivery line 20 as pressurized oil. The pressurized oil delivered to the first main delivery line 18 and the second main delivery line 20 is supplied through the control valve device 28 to the respective hydraulic actuators 2B to 5G. In this way, the first main hydraulic pump 14 and the second main hydraulic pump 15 configure a main hydraulic source together with the hydraulic oil tank 17 storing the hydraulic oil therein.

Here, the first main hydraulic pump 14 is connected through the first main delivery line 18 and a first center bypass line 19 to a directional control valve 28A for right side traveling motor, a directional control valve 28B for bucket, a first directional control valve 28C for boom and a first directional control valve 28D for arm, which configure the control valve device 28. Consequently, the first main hydraulic pump 14 delivers the pressurized oil to a plurality of hydraulic actuators including the hydraulic motor 2C for right side traveling, that is, the hydraulic motor 2C for right side traveling as one traveling hydraulic motor, the bucket cylinder 5F, the boom cylinder 5D and the arm cylinder 5E, respectively.

In addition, the second main hydraulic pump 15 is connected through the second main delivery line 20 and a second center bypass line 21 to a directional control valve 28E for revolving, a second directional control valve 28F for arm, a second directional control valve 28G for boom, a directional control valve 28H for attachment and a directional control valve 28I for left side traveling motor, which configure the control valve device 28. Consequently, the second main hydraulic pump 15 delivers the pressurized oil to a plurality of hydraulic actuators including the hydraulic motor 2B for left side traveling, that is, the hydraulic motor 2B for left side traveling as the other traveling hydraulic motor, the revolving hydraulic motor 3A, the arm cylinder 5E, the boom cylinder 5D and the attachment cylinder 5G.

In addition, the first main delivery line 18 and the second main delivery line 20 are connected through a check valve 22 and a main relief valve 23 to the hydraulic oil tank 17. The main relief valve 23 limits the maximum pressure of the first main delivery line 18 and the second main delivery line 20. That is, the main relief valve 23 opens when a pressure in the first main delivery line 18 or a pressure in the second main delivery line 20 exceeds a predetermined pressure (set pressure) to relieve an excessive pressure to the hydraulic oil tank 17-side.

The pilot hydraulic pump 16 is configured by, for example, a fixed displacement gear pump or a swash plate hydraulic pump. The pilot hydraulic pump 16 delivers the hydraulic oil stored in the hydraulic oil tank 17 to a pilot delivery line 24 as pressurized oil. The pilot hydraulic pump 16 is connected through the pilot delivery line 24 and a pilot line 25 for operation to the respective operating devices 8A to 8E2. Further, the pilot hydraulic pump 16 is connected through the pilot delivery line 24 and a pilot line 26 for pump control to the first and second torque control proportional electromagnetic valves 37, 38.

That is, the pilot hydraulic pump 16 delivers the pressurized oil to the respective operating devices 8A to 8E2 and the first and second torque control proportional electromagnetic valves 37, 38. In this case, the pressurized oil in the pilot hydraulic pump 16 is delivered through the respective operating devices 8A to 8E2 to the control valve device 28 (respective directional control valves 28A to 28I). The pressurized oil in the pilot hydraulic pump 16 is delivered through the first and second torque control proportional electromagnetic valves 37, 38 to first and second torque control regulators 32, 35. Further, the pressurized oil in the pilot hydraulic pump 16 is delivered through the respective operating devices 8A to 8E2, after-mentioned shuttle valves 29A to 29M and the first and second flow rate control proportional electromagnetic valves 39, 40 to first and second flow rate control regulators 33, 36.

In this way, the pilot hydraulic pump 16 configures a pilot hydraulic source together with the hydraulic oil tank 17. In addition, the pilot delivery line 24 is connected through a pilot relief valve 27 to the hydraulic oil tank 17. The pilot relief valve 27 limits the maximum pressure of the pilot delivery line 24. That is, the pilot relief valve 27 opens when a pressure in the pilot delivery line 24 exceeds a predetermined pressure (set pressure) to relieve an excessive pressure to the hydraulic oil tank 17-side.

The control valve device 28 is a control valve group (control valve device) composed of the plurality of directional control valves 28A to 28I. The control valve device 28 distributes the pressurized oil delivered from the main hydraulic pumps 14, 15 to the respective hydraulic actuators 2B to 5G in response to an operation of the operating device 8. That is, the control valve device 28 controls a direction of the pressurized oil to be delivered to the respective hydraulic actuators 2B to 5G from the first and second main hydraulic pumps 14, 15 in response to a switching signal (pilot pressure) by an operation of the operating device 8 disposed in the cab 7. As a result, the respective hydraulic actuators 2B to 5G drive (expand, contract, rotate) by the pressurized oil (hydraulic oil) delivered from the first and second main hydraulic pumps 14, 15.

Each of the directional control valves 28A to 28I in the control valve device 28 is configured by a directional control valve of a pilot operation type, for example, a directional control valve of a hydraulic pilot type having six ports and three positions. A switching signal (pilot pressure) based upon an operation of each of the operating devices 8A to 8E2 is supplied to a hydraulic pilot part of each of the directional control valves 28A to 28I. Thereby, each of the directional control valves 28A to 28I is operated/switched.

The control valve device 28 is provided with the directional control valve 28A for right side traveling motor, the directional control valve 28B for bucket, the first directional control valve 28C for boom and the first directional control valve 28D for arm, the directional control valve 28E for revolving, the second directional control valve 28F for arm, the second directional control valve 28G for boom, the directional control valve 28H for attachment and the directional control valve 28I for left side traveling motor.

The directional control valve 28A for right side traveling motor forward or backward rotates the hydraulic motor 2C for right side traveling by switching delivery and discharge of the pressurized oil to and from the hydraulic motor 2C for right side traveling between the first main hydraulic pump 14 and the hydraulic motor 2C for right side traveling. The directional control valve 28B for bucket expands or contracts the bucket cylinder 5F by switching delivery and discharge of the pressurized oil to and from the bucket cylinder 5F between the first main hydraulic pump 14 and the bucket cylinder 5F. The first directional control valve 28C for boom expands or contracts the boom cylinder 5D by switching delivery and discharge of the pressurized oil to the boom cylinder 5D between the first main hydraulic pump 14 and the boom cylinder 5D. The first directional control valve 28D for arm expands or contracts the arm cylinder 5E by switching delivery and discharge of the pressurized oil to and from the arm cylinder 5E between the first main hydraulic pump 14 and the arm cylinder 5E.

The directional control valve 28E for revolving forward or backward rotates the revolving hydraulic motor 3A by switching delivery and discharge of the pressurized oil to and from the revolving hydraulic motor 3A between the second main hydraulic pump 15 and the revolving hydraulic motor 3A. The second directional control valve 28F for arm expands or contracts the arm cylinder 5E by switching delivery and discharge of the pressurized oil to and from the arm cylinder 5E between the second main hydraulic pump 15 and the arm cylinder 5E. The second directional control valve 28G for boom expands or contracts the boom cylinder 5D by switching delivery and discharge of the pressurized oil to and from the boom cylinder 5D between the second main hydraulic pump 15 and the boom cylinder 5D. The directional control valve 28H for attachment expands or contracts the attachment cylinder 5G by switching delivery and discharge of the pressurized oil to and from the attachment cylinder 5G between the second main hydraulic pump 15 and the attachment cylinder 5G. The directional control valve 28I for left side traveling motor forward or backward rotates the hydraulic motor 2B for left side traveling by switching delivery and discharge of the pressurized oil to and from the hydraulic motor 2B for left side traveling between the second main hydraulic pump 15 and the hydraulic motor 2B for left side traveling.

The operating device 8 includes the lever/pedal operating devices 8A, 8B for left side and right side traveling, the pedal operating device 8C for attachment, the lever operating device 8D1 for revolving, the lever operating device 8D2 for arm, the lever operating device 8E1 for boom, and the lever operating device 8E2 for bucket. Each of the operating devices 8A to 8E2 is configured by a pressure reducing-valve type pilot valve of a lever type, for example. The pressurized oil is delivered to each of the operating devices 8A to 8E2 from the pilot hydraulic pump 16. Each of the operating devices 8A to 8E2 outputs a pilot pressure in response to a lever operation or a pedal operation by an operator to each of the directional control valves 28A to 28I.

That is, each of the operating devices 8A to 8E2 is operated by an operator, thereby supplying (outputting) a pilot pressure in proportion to the operating amount to the hydraulic pilot part of each of the directional control valves 28A to 28I. For example, when the lever operating device 8E1 for boom is operated in a direction of expanding the boom cylinder 5D (that is, when a raising operation for raising the boom 5A is performed), the pilot pressure (BmU) generated by this operation is supplied to the hydraulic pilot part in each of the first directional control valve 28C for boom and the second directional control valve 28G for boom. Thereby, the first and second directional control valves 28C, 28G for boom are switched from a neutral position to a switching position in the left side in FIG. 2 and FIG. 3. As a result, the pressurized oil from the first main hydraulic pump 14 and the second main hydraulic pump 15 is delivered to a bottom side oil chamber in the boom cylinder 5D, and the pressurized oil in a rod side oil chamber of the boom cylinder 5D is returned to the hydraulic oil tank 17. Thereby, the boom cylinder 5D expands to displace (swing) the boom 5A upward.

Meanwhile, when the lever operating device 8E1 for boom is operated in a direction of contracting the boom cylinder 5D (that is, when a lowering operation for lowering the boom 5A is performed), the pilot pressure (BmD) generated by this operation is supplied to the hydraulic pilot part in each of the first directional control valve 28C for boom and the second directional control valve 28G for boom. Thereby, the first and second directional control valves 28C, 28G for boom are switched from a neutral position to a switching position in the right side in FIG. 2 and FIG. 3. As a result, the pressurized oil from the first main hydraulic pump 14 and the second main hydraulic pump 15 is delivered to the rod side oil chamber in the boom cylinder 5D, and the pressurized oil in the bottom side oil chamber of the boom cylinder 5D is returned to the hydraulic oil tank 17. Thereby, the boom cylinder 5D contracts to displace (swing) the boom 5A downward. It should be noted that operations of the operating devices 8A to 8D and 8E2 other than the lever operating device 8E1 for boom are similar to that of the lever operating device 8E1 for boom other than a point where "directional control valve to be switched by the operating device" and "hydraulic actuator to be operated by the switching of the directional control valve" differ. Therefore, an explanation of the operating devices 8A to 8E2 more than this is omitted.

Meanwhile, in the pilot pressure outputted from each of the operating devices 8A to 8E2, a necessary output pressure is taken out through shuttle valves 29A to 29N. Here, the operating devices 8B, 8E2, 8E1, 8D1 are operating devices used in the hydraulic actuators 2C, 5F, 5D, 5E driven by the pressurized oil of the first main hydraulic pump 14. The maximum output pressure of the pilot pressure outputted from the operating devices 8B, 8E2, 8E1, 8D1 is taken out through the shuttle valves 29A, 29C, 29D, 29E, 29I, 29H, 29K. The pilot pressure (PC1) taken out through the shuttle valves 29A, 29C, 29D, 29E, 29I, 29H, 29K is supplied to the first flow rate control proportional electromagnetic valve 39.

On the other hand, the operating devices 8D2, 8D1, 8E1, 8C, 8A are operating devices used in the hydraulic actuators 3A, 5E, 5D, 5G, 2B driven by the pressurized oil of the second main hydraulic pump 15. The maximum output pressure of the pilot pressures outputted from the operating devices 8D2, 8D1, 8E1, 8C, 8A is taken out through the shuttle valves 29G, 29F, 29E, 29D, 29B, 29J, 29I, 29L, 29M. The pilot pressure (PC2) taken out through the shuttle valves 29G, 29F, 29E, 29D, 29B, 29J, 29I, 29L, 29M is supplied to the second flow rate control proportional electromagnetic valve 40. Further, the maximum output pressure of the pilot pressures outputted from the lever/pedal operating device 8A for left side traveling and the lever/pedal operating device 8B for right side traveling is taken out through the shuttle valves 29A, 29B, 29N. The pressure (pilot pressure) taken out through the shuttle valves 29A, 29B, 29N is supplied to a hydraulic pilot part 48D in an after-described switching valve 48. The hydraulic pressure (pilot pressure) is detected by a pressure sensor 46 for travel operation detection to be described later.

Next, an explanation will be made of the configuration for variably adjusting a displacement (delivery flow rate) of the main hydraulic pumps 14, 15.

The first main hydraulic pump 14 has the first displacement variable part 14A. For driving the first displacement variable part 14A, the first main hydraulic pump 14 includes the first tilting actuator 31, the first torque control regulator 32 as a first regulator and the first flow rate control regulator 33. In this case, each of the first torque control regulator 32 (a sleeve thereof) and the first flow rate control regulator 33 (a sleeve thereof) is jointed to a control piston 31A of the first tilting actuator 31 by a rod. In addition, the control piston 31A of the first tilting actuator 31 is jointed to the first displacement variable part 14A. Thereby, the tilting of the first displacement variable part 14A in the first main hydraulic pump 14 is feed-backed to the first torque control regulator 32 and the first flow rate control regulator 33.

The first tilting actuator 31 controls the tilting of the first displacement variable part 14A of the first main hydraulic pump 14. That is, the first tilting actuator 31 drives the first displacement variable part 14A to increase/decrease a delivery amount of the pressurized oil to be delivered from the first main hydraulic pump 14. The first tilting actuator 31 includes the control piston 31A having a large diameter part and a small diameter part that are different in a diameter dimension from each other and is jointed to the first displacement variable part 14A, a small diameter side pressure receiving chamber 31B to which the pressurized oil from the pilot hydraulic pump 16 is directly delivered, and a large diameter side pressure receiving chamber 31C to which the pressurized oil from the pilot hydraulic pump 16 is delivered through the first torque control regulator 32 and the first flow rate control regulator 33.

The first torque control regulator 32 is a regulator for controlling torque of the first main hydraulic pump 14. That is, the first torque control regulator 32 variably controls a control pressure that is supplied to/delivered from the large diameter side pressure receiving chamber 31C of the first tilting actuator 31 in the first main hydraulic pump 14. The first torque control regulator 32 is configured to include a spool 32A, a first pressure receiving chamber 32B to which a delivery pressure of the second main hydraulic pump 15 (second main delivery line 20) is led, a second pressure receiving chamber 32C to which a delivery pressure of the first main hydraulic pump 14 (first main delivery line 18) is led, a third pressure receiving chamber 32D to which an output pressure of the first torque control proportional electromagnetic valve 37 is led through a first torque control line 41, and a spring 32E that urges the spool 32A toward the pressure receiving chambers 32B, 32C, 32D. The spool 32A of the first torque control regulator 32 is controlled to make a balance between pressures of the pressure receiving chambers 32B, 32C, 32D and a spring force of the spring 32E.

The first flow rate control regulator 33 is a regulator for controlling a flow rate (delivery amount) of the first main hydraulic pump 14, that is, the maximum tilting of the first displacement variable part 14A. That is, the first flow rate control regulator 33 variably controls a control pressure that is supplied to/delivered from the large diameter side pressure receiving chamber 31C of the first tilting actuator 31 in the first main hydraulic pump 14. The first flow rate control regulator 33 is configured to include a spool 33A, a first pressure receiving chamber 33B to which an output pressure of the first flow rate control proportional electromagnetic valve 39 is led through a first flow rate control line 43, a second pressure receiving chamber 33C that is connected to the hydraulic oil tank 17 and to which a tank pressure is led and a spring 33D that is provided in the second pressure receiving chamber 33C-side and urges the spool 33A toward the first pressure receiving chamber 33B. The spool 33A of the first flow rate control regulator 33 is controlled to make a balance between a pressure of the first pressure receiving chamber 33B and a spring force of the spring 33D.

The second main hydraulic pump 15 has the second displacement variable part 15A. For driving the second displacement variable part 15A, the second main hydraulic pump 15 as well, as similar to the first main hydraulic pump 14, includes the second tilting actuator 34, the second torque control regulator 35 as a second regulator and the second flow rate control regulator 36. It should be noted that the second tilting actuator 34, the second torque control regulator 35 and the second flow rate control regulator 36 are similar to the first tilting actuator 31, the first torque control regulator 32 and the first flow rate control regulator 33 that are described above other than a difference as a point of driving the second displacement variable part 15A of the second main hydraulic pump 15.

That is, the second tilting actuator 34 drives the second displacement variable part 15A to increase/decrease a delivery amount of the pressurized oil to be delivered from the second main hydraulic pump 15. Therefore, the second tilting actuator 34 is configured to include a control piston 34A, a small diameter side pressure receiving chamber 34B and a large diameter side pressure receiving chamber 34C. The second torque control regulator 35 variably controls a control pressure that is supplied to/delivered from the large diameter side pressure receiving chamber 34C of the second tilting actuator 34 in the second main hydraulic pump 15. Therefore, the second torque control regulator 35 is configured to include a spool 35A, a first pressure receiving chamber 35B, a second pressure receiving chamber 35C, a third pressure receiving chamber 35D to which an output pressure of the second torque control proportional electromagnetic valve 38 is led through a second torque control line 42 and a spring 35E. The second flow rate control regulator 36 variably controls a control pressure that is supplied to/delivered from the large diameter side pressure receiving chamber 34C of the second tilting actuator 34 in the second main hydraulic pump 15. Therefore, the second flow rate control regulator 36 is configured to include a spool 36A, a first pressure receiving chamber 36B to which an output pressure of the second flow rate control proportional electromagnetic valve 40 is led through a second flow rate control line 44, a second pressure receiving chamber 36C and a spring 36D.

The first torque control proportional electromagnetic valve 37 as a first proportional electromagnetic valve is connected through the pilot delivery line 24 and the pilot line 26 for pump control to the pilot hydraulic pump 16. In addition, the first torque control proportional electromagnetic valve 37 is connected through the first torque control line 41 to the third pressure receiving chamber 32D in the first torque control regulator 32. The first torque control proportional electromagnetic valve 37 supplies an output pressure to the third pressure receiving chamber 32D in the first torque control regulator 32 based upon a command from the controller 47. That is, the first torque control proportional electromagnetic valve 37 is configured by a proportional electromagnetic valve (proportional pressure reducing valve) having three ports and two positions, for example and is connected to the controller 47. In this case, a control signal (current signal) from the controller 47 is inputted to the first torque control proportional electromagnetic valve 37. That is, an opening degree of the first torque control proportional electromagnetic valve 37 is adjusted in proportion to a current value of the control signal. Thereby, the output pressure to be supplied to the third pressure receiving chamber 32D in the first torque control regulator 32 through the first torque control proportional electromagnetic valve 37 changes.

The second torque control proportional electromagnetic valve 38 as a second proportional electromagnetic valve is, as similar to the first torque control proportional electromagnetic valve 37, connected to the pilot hydraulic pump 16. The second torque control proportional electromagnetic valve 38 is connected through the second torque control line 42 to the third pressure receiving chamber 35D in the second torque control regulator 35. The second torque control proportional electromagnetic valve 38 supplies an output pressure to the third pressure receiving chamber 35D in the second torque control regulator 35 based upon a command from the controller 47. That is, the second torque control proportional electromagnetic valve 38 as well is, as similar to the first torque control proportional electromagnetic valve 37, configured by a proportional electromagnetic valve (proportional pressure reducing valve) having three ports and two positions, for example and an opening degree of the second torque control proportional electromagnetic valve 38 is adjusted in proportion to a current value of the control signal (current signal) from the controller 47. Thereby, the output pressure to be supplied to the third pressure receiving chamber 35D in the second torque control regulator 35 through the second torque control proportional electromagnetic valve 38 changes.

The first flow rate control proportional electromagnetic valve 39 is connected through the pilot delivery line 24, the pilot line 25 for operation, the operating device 8 (8B, 8E2, 8E1, 8D1), the shuttle valves 29A, 29C, 29D, 29E, 29I, 29H, 29K to the pilot hydraulic pump 16. In addition, the first flow rate control proportional electromagnetic valve 39 is connected through the first flow rate control line 43 to the first pressure receiving chamber 33B in the first flow rate control regulator 33. The first flow rate control proportional electromagnetic valve 39 supplies an output pressure to the first pressure receiving chamber 33B in the first flow rate control regulator 33 based upon a command from the controller 47.

That is, the first flow rate control proportional electromagnetic valve 39 is configured by a proportional electromagnetic valve (proportional pressure reducing valve) having three ports and two positions, for example and is connected to the controller 47. In this case, a control signal (current signal) from the controller 47 is inputted to the first flow rate control proportional electromagnetic valve 39. That is, an opening degree of the first flow rate control proportional electromagnetic valve 39 is adjusted in proportion to a current value of the control signal. Thereby, the output pressure to be supplied to the first pressure receiving chamber 33B in the first flow rate control regulator 33 through the first flow rate control proportional electromagnetic valve 39 changes. That is, the pilot pressure (PC1) taken out of the shuttle valve 29K is reduced by the first flow rate control proportional electromagnetic valve 39 based upon a command of the controller 47 as needed, which is supplied to the first pressure receiving chamber 33B in the first flow rate control regulator 33.

The second flow rate control proportional electromagnetic valve 40 is connected through the pilot delivery line 24, the pilot line 25 for operation, the operating device 8 (8D2, 8D1, 8E1, 8C, 8A), the shuttle valves 29G, 29F, 29E, 29D, 29B, 29J, 29I, 29L, 29M to the pilot hydraulic pump 16. In addition, the second flow rate control proportional electromagnetic valve 40 is connected through the second flow rate control line 44 to the first pressure receiving chamber 36B in the second flow rate control regulator 36. The second flow rate control proportional electromagnetic valve 40 supplies an output pressure to the first pressure receiving chamber 36B in the second flow rate control regulator 36 based upon a command from the controller 47.

That is, the second flow rate control proportional electromagnetic valve 40 as well, as similar to the first flow rate control proportional electromagnetic valve 39, is configured by a proportional electromagnetic valve (proportional pressure reducing valve) having three ports and two positions, for example and an opening degree of the second flow rate control proportional electromagnetic valve 40 is adjusted in proportion to a current value of the control signal (current signal) from the controller 47. Thereby, the output pressure to be supplied to the first pressure receiving chamber 36B in the second flow rate control regulator 36 through the second flow rate control proportional electromagnetic valve 40 changes. That is, the pilot pressure (PC2) taken out of the shuttle valve 29M is reduced by the second flow rate control proportional electromagnetic valve 40 based upon a command of the controller 47 as needed, which is supplied to the first pressure receiving chamber 36B in the second flow rate control regulator 36.

The first torque control line 41 is a first oil passage provided between the first torque control proportional electromagnetic valve 37 and the third pressure receiving chamber 32D in the first torque control regulator 32. The second torque control line 42 is a second oil passage provided between the second torque control proportional electromagnetic valve 38 and the third pressure receiving chamber 35D in the second torque control regulator 35. The first flow rate control line 43 is provided between the first flow rate control proportional electromagnetic valve 39 and the first pressure receiving chamber 33B in the first flow rate control regulator 33. The second flow rate control line 44 is provided between the second flow rate control proportional electromagnetic valve 40 and the first pressure receiving chamber 36B in the second flow rate control regulator 36. A switching pilot line 45 is provided between the shuttle valve 29N and the hydraulic pilot part 48D in the after-described switching valve 48.

The pressure sensor 46 for travel operation detection is provided in a delivery side of the shuttle valve 29N, that is, in the switching pilot line 45. The pressure sensor 46 for travel operation detection is connected to the controller 47. The pressure sensor 46 for travel operation detection detects a pressure taken out of the shuttle valve 29N, that is, the maximum output pressure of the pilot pressures outputted from the lever/pedal operating device 8A for left side traveling and the lever/pedal operating device 8B for right side traveling, and outputs the detected pressure signal to the controller 47. That is, the pressure sensor 46 for travel operation detection is a drive detecting device that detects a drive of at least any one of the hydraulic motor 2B for left side traveling and the hydraulic motor 2C for right side traveling.

The controller 47 has an input side that is connected to the pressure sensor 46 for travel operation detection. An output side of the controller 47 is connected to the proportional electromagnetic valves 37, 38, 39, 40. The controller 47 is a control device that is configured to include, for example, a microcomputer provided with a memory and a calculation circuit (CPU), a drive circuit, a power source circuit and the like. The controller 47 controls the proportional electromagnetic valves 37, 38, 39, 40 in response to an operating situation of the hydraulic excavator 1 detected from various kinds of sensors including the pressure sensor 46 for travel operation detection or the like to perform the torque control and flow rate control of the first and second main hydraulic pumps 14, 15. It should be noted that in regard to the torque control and flow rate control of the first and second main hydraulic pumps 14, 15 using the controller 47 and the proportional electromagnetic valves 37, 38, 39, 40, since there are conventionally known various kinds of torque control and flow rate control, an explanation in more detail is omitted.

Incidentally, the hydraulic motor 2C for right side traveling is driven by the first main hydraulic pump 14, and the hydraulic motor 2B for left side traveling is driven by the second main hydraulic pump 15. Here, in the middle of traveling straight by both of the hydraulic motor 2B for left side traveling and the hydraulic motor 2C for right side traveling, it is not preferable for the hydraulic excavator 1 to mistrack due to a difference in rotational amount between both of the hydraulic motors 2B, 2C. Therefore, for example, when the travel operation is detected by the pressure sensor 46 for travel operation detection, it is considered that the controller 47 outputs the same command value (command signal) to both of the first torque control proportional electromagnetic valve 37 and the second torque control proportional electromagnetic valve 38.

Figure 14:
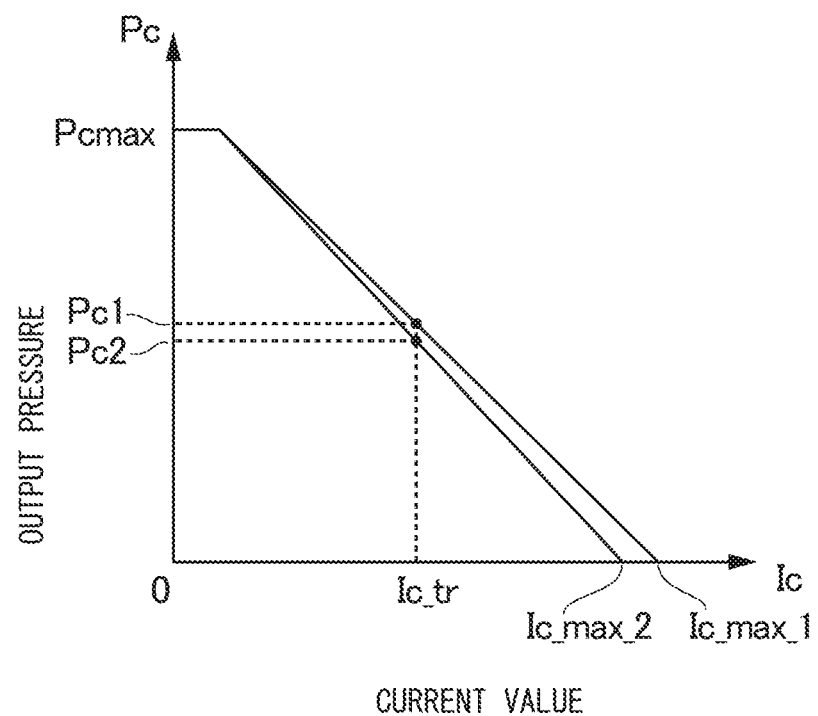
FIG. 14 is a characteristic diagram showing an example of output characteristics of two proportional electromagnetic valves.

As shown in FIG. 14, however, an unavoidable individual difference (so-called variations) possibly occurs between a characteristic of the first torque control proportional electromagnetic valve 37 and a characteristic of the second torque control proportional electromagnetic valve 38. Therefore, even when the same command value is outputted to both of the torque control proportional electromagnetic valves 37, 38 from the controller 47, a difference between output of the first torque control proportional electromagnetic valve 37 and output of the second torque control proportional electromagnetic valve 38 possibly occurs. Consequently, a difference between a delivery flow rate of the first main hydraulic pump 14 (that is, a flow rate of pressurized oil to be supplied to the hydraulic motor 2C for right side travel) and a delivery flow rate of the second main hydraulic pump 15 (that is, a flow rate of pressurized oil to be supplied to the hydraulic motor 2B for left side travel) possibly occurs. That is, even in a case of performing the straight travel operation of the lever/pedal operating devices 8A, 8B for left side and right side traveling (the same amount operation, for example, a full operation of both of the left and right lever/pedals), the hydraulic excavator 1 mistracks against an intent of an operator, creating a possibility that the operability degrades.

Therefore, in the first embodiment, the switching valve 48 is provided for suppressing the mistracking. In this case, the switching valve 48 is provided between the first torque control line 41 and the second torque control line 42. Here, the first torque control line 41 is configured by a main line 41A establishing connection between the first torque control proportional electromagnetic valve 37 and the first torque control regulator 32, and a branch line 41B branching from the main line 41A. Meanwhile, the second torque control line 42 is configured by an electromagnetic valve side line 42A establishing connection between the second torque control proportional electromagnetic valve 38 and the switching valve 48, and a regulator side line 42B establishing connection between the switching valve 48 and the second torque control regulator 35.

The switching valve 48 is provided between the branch line 41B of the first torque control line 41 and the regulator side line 42B of the second torque control line 42 and between the electromagnetic valve side line 42A and the regulator side line 42B in the second torque control line 42. The switching valve 48 supplies the output pressure of the first torque control proportional electromagnetic valve 37 to the third pressure receiving chamber 35D in the second torque control regulator 35 at the time of driving at least any one of the hydraulic motor 2B for left side traveling and the hydraulic motor 2C for right side traveling.

Therefore, the switching valve 48 is configured by a hydraulic pilot switching valve having three ports and two positions, for example. A first port 48A of the switching valve 48 is connected through the branch line 41B and the main line 41A of the first torque control line 41 to the first torque control proportional electromagnetic valve 37. A second port 48B of the switching valve 48 is connected through the electromagnetic valve side line 42A of the second torque control line 42 to the second torque control proportional electromagnetic valve 38. A third port 48C of the switching valve 48 is connected through the regulator side line 42B of the second torque control line 42 to the third pressure receiving chamber 35D in the second torque control regulator 35.

In addition, the switching valve 48 has the hydraulic pilot part 48D. The hydraulic pilot part 48D is connected through the switching pilot line 45 to the shuttle valve 29N. A higher pilot pressure of the pilot pressure outputted from the lever/pedal operating device 8A for left side traveling and the pilot pressure outputted from the lever/pedal operating device 8B for right side traveling is supplied to the hydraulic pilot part 48D. That is, the switching valve 48 is switched from a neutral position (A) to a switching position (B) when the pilot pressure is supplied to the hydraulic pilot part 48D by operating at least one of the lever/pedal operating devices 8A, 8B for left side and right side traveling from a state where both of them are not operated.

The neutral position (A) is a position of cutting off connection between the first torque control proportional electromagnetic valve 37 and the third pressure receiving chamber 35D in the second torque control regulator 35 and establishing connection between the second torque control proportional electromagnetic valve 38 and the third pressure receiving chamber 35D in the second torque control regulator 35. The switching position (B) is a position of establishing the connection between the first torque control proportional electromagnetic valve 37 and the third pressure receiving chamber 35D in the second torque control regulator 35 and cutting off the connection between the second torque control proportional electromagnetic valve 38 and the third pressure receiving chamber 35D in the second torque control regulator 35.

Accordingly, when none of the hydraulic motors 2B, 2C for left side and right side traveling is driven, the switching valve 48 cuts off the connection between the first torque control proportional electromagnetic valve 37 and the third pressure receiving chamber 35D in the second torque control regulator 35 and establishing the connection between the second torque control proportional electromagnetic valve 38 and the third pressure receiving chamber 35D in the second torque control regulator 35. Thereby, when both of the hydraulic motors 2B, 2C for left side and right side traveling are stopped, the output pressure of the first torque control proportional electromagnetic valve 37 is supplied to the third pressure receiving chamber 32D in the first torque control regulator 32. Meanwhile, the output pressure of the second torque control proportional electromagnetic valve 38 is supplied to the third pressure receiving chamber 35D in the second torque control regulator 35.

On the other hand, when at least any one of the hydraulic motors 2B, 2C for left side and right side traveling is driven, the switching valve 48 cuts off the connection between the second torque control proportional electromagnetic valve 38 and the third pressure receiving chamber 35D in the second torque control regulator 35 and connects the first torque control proportional electromagnetic valve 37 to both the third pressure receiving chamber 32D in the first torque control regulator 32 and the third pressure receiving chamber 35D in the second torque control regulator 35. In addition, the controller 47 gives a command signal (command value) to at least the first torque control proportional electromagnetic value 37 when a drive of the hydraulic motor 2B or 2C for traveling is detected by the pressure sensor 46 for travel operation detection. Thereby, when at least one of the hydraulic motor 2B or 2C for traveling is rotated, the output pressure from the first torque control proportional electromagnetic valve 37 in response to the command signal (command value) of the controller 47 is supplied to both the third pressure receiving chamber 32D in the first torque control regulator 32 and the third pressure receiving chamber 35D in the second torque control regulator 35.

The hydraulic drive apparatus of the hydraulic excavator 1 according to the first embodiment has the configuration as described above, and next, an operation thereof will be explained.

When an operator who gets in the cab 7 starts the engine 12, the hydraulic pumps 14, 15, 16 are driven by the engine 12. The pressurized oil delivered from the main hydraulic pumps 14, 15 is supplied respectively to the hydraulic motors 2B, 2C for traveling and the revolving hydraulic motor 3A, the boom cylinder 5D, the arm cylinder 5E, the bucket cylinder 5F and the attachment cylinder 5G in the working mechanism 5 in response to the lever operation and the pedal operation of the operating devices 8A to 8E2 provided in the cab 7. Thereby, the hydraulic excavator 1 can perform the traveling operation by the lower traveling structure 2, the revolving operation of the upper revolving structure 4, the excavating operation by the working mechanism 5, and the like.

Meanwhile, the pressurized oil delivered from the pilot hydraulic pump 16 is supplied to the pilot delivery line 24, generating a constant pilot pressure Pip by the pilot relief valve 27. In a case where all the operating devices 8A to 8E2 are in a neutral position, all the directional control valves 28A to 28I in the control valve device 28 are held in the neutral position by springs. The pressurized oil delivered from the first main hydraulic pump 14 is supplied through the first main delivery line 18 to the control valve device 28, which is discharged through the first center bypass line 19 to the hydraulic oil tank 17. The pressurized oil delivered from the second main hydraulic pump 15 is supplied through the second main delivery line 20 to the control valve device 28, which is discharged through the second center bypass line 21 to the hydraulic oil tank 17.

(1) Case where all the Operating Devices 8A to 8E2 are in a Neutral Position

Since all the operating devices 8A to 8E2 are in the neutral position, the maximum output pressure PC1 of the operating devices 8B, 8E2, 8E1, 8D1 for the hydraulic actuators 2C, 5F, 5D, 5E driven by the pressurized oil of the first main hydraulic pump 14 becomes a tank pressure. The maximum output pressure PC2 of the operating devices 8D2, 8D1, 8E1, 8C, 8A for the hydraulic actuators 3A, 5E, 5D, 5G, 2B driven by the pressurized oil of the second main hydraulic pump 15 likewise becomes the tank pressure.

The maximum output pressure PC1 is led to an input pressure to the first flow rate control proportional electromagnetic valve 39 as the flow rate control proportional electromagnetic valve for the first main hydraulic pump 14. Therefore, the first flow rate control proportional electromagnetic valve 39 outputs the tank pressure even in a case of any command signal (any command value) outputted from the controller 47. The output of the first flow rate control proportional electromagnetic valve 39 is led through the first flow rate control line 43 to the first pressure receiving chamber 33B in the first flow rate control regulator 33, but the pressure is the tank pressure. Therefore, the spool 33A of the first flow rate control regulator 33 is switched in the left direction in the figure by a spring force of the spring 33D. Thereby, the constant pilot pressure Pip generated in the pilot delivery line 24 is led as input of the first torque control regulator 32 at downstream of the first flow rate control regulator 33.

In this way, the pilot pressure Pip is given as an input pressure of the first torque control regulator 32 from the first flow rate control regulator 33. Therefore, the first torque control regulator 32 guides the constant pilot pressure Pip to the large diameter side pressure receiving chamber 31C in the first tilting actuator 31 regardless of the switching position of the spool 32A. Meanwhile, the constant pilot pressure Pip is led to the small diameter side pressure receiving chamber 31B in the first tilting actuator 31 as well. However, the control piston 31A in the first tilting actuator 31 moves in the left direction in the figure, that is, in a direction of reducing the tilting of the first main hydraulic pump 14 by a difference in a pressure receiving area between the small diameter side pressure receiving chamber 31B and the large diameter side pressure receiving chamber 31C.

The tilting of the first main hydraulic pump 14 is feed-backed to the first flow rate control regulator 33 through the rod, and is held in the tilting in accordance with a command pressure of the first flow rate control proportional electromagnetic valve 39. In a case where all the operating devices 8A to 8E2 are in the neutral position, since the command pressure of the first flow rate control proportional electromagnetic valve 39 is equal to the tank pressure, the tilting of the first main hydraulic pump 14 is held to a minimum value. The second flow rate control regulator 36 and the second torque control regulator 35 in the second main hydraulic pump 15-side also operate in the same way as the first flow rate control regulator 33 and the first torque control regulator 32 in the first main hydraulic pump 14-side, and the tilting of the second main hydraulic pump 15 as well is held to a minimum value.

(2) Case of Operating the Lever Operating Device 8E1 for Boom

For example, when the lever operating device 8E1 for boom is operated in a direction of expanding the boom cylinder 5D (that is, when a raising operation of raising the boom 5A is performed), one pilot valve of the lever operating device 8E1 for boom (in the left side in the figure) is subjected to forces in the lower direction by the operating lever. The pilot valve of the lever operating device 8E1 for boom in the left side outputs a pilot pressure (raising operation pressure) in accordance with an operating amount of the operating lever as "BmU". The pilot pressure BmU is supplied to a hydraulic pilot part (hydraulic pilot part in the left side in the figure) of each of the first directional control valve 28C for boom and the second directional control valve 28G for boom. Consequently, the first directional control valve 28C for boom and the second directional control valve 28G for boom (spools thereof) are switched in the right direction in the figure.

The pressurized oil delivered from the first main hydraulic pump 14 is led through the first main delivery line 18 and the first center bypass line 19 to the first directional control valve 28C for boom. When the first directional control valve 28C for boom is switched, the first center bypass line 19 is cut off. Therefore, the pressurized oil delivered from the first main hydraulic pump 14 is supplied through a parallel passage to the bottom side oil chamber of the boom cylinder 5D. Meanwhile, the pressurized oil delivered from the second main hydraulic pump 15 is led through the second main delivery line 20 and the second center bypass line 21 to the second directional control valve 28G for boom. When the second directional control valve 28G for boom is switched, the second center bypass line 21 is cut off. Therefore, the pressurized oil delivered from the first main hydraulic pump 14 is supplied through the parallel passage to the bottom side oil chamber of the boom cylinder 5D. At this time, the pressurized oil of the second directional control valve 28G for boom and the pressurized oil of the first directional control valve 28C for boom are combined, which is supplied to the bottom side oil chamber of the boom cylinder 5D.

In addition, the boom raising operation pressure BmU is led through the shuttle valves 29D, 29I, 29K as an actuator maximum operation pressure PC1 in the first main hydraulic pump 14-side. Along with this, the boom raising operation pressure BmU is led through the shuttle valves 29D, 29I, 29L, 29M as an actuator maximum operation pressure PC2 in the second main hydraulic pump 15-side. The actuator maximum operation pressure PC1 in the first main hydraulic pump 14-side is led to the first flow rate control proportional electromagnetic valve 39, is reduced in pressure by the controller 47 as needed, and is led to the first flow rate control line 43. That is, the first flow rate control proportional electromagnetic valve 39 reduces the maximum operation pressure PC1 based upon a command of the controller 47, which is outputted to the first flow rate control line 43. An output pressure of the first flow rate control proportional electromagnetic valve 39 displaces the spool 33A in a position of balancing the spring 33D as a command pressure (flow rate command pressure) of the first flow rate control regulator 33. As a result, a tilting amount of the first main hydraulic pump 14 is feed-backed through a rod to the first flow rate control regulator 33. Therefore, the first flow rate control regulator 33 controls an input pressure to the downstream first torque control regulator 32 such that the tilting amount of the first main hydraulic pump 14 is an output pressure of the first flow rate control proportional electromagnetic valve 39.

Meanwhile, the constant pilot pressure Pip as input is led through the pilot delivery line 24 to the first torque control proportional electromagnetic valve 37. The first torque control proportional electromagnetic valve 37 reduces the pilot pressure Pip based upon a command of the controller 47 to output a torque command pressure to the first torque control line 41. The delivery pressure of the second main hydraulic pump 15 is led to the first pressure receiving chamber 32B in the first torque control regulator 32. The delivery pressure of the first main hydraulic pump 14 is led to the second pressure receiving chamber 32C. The output pressure of the first torque control proportional electromagnetic valve 37 is led to the third pressure receiving chamber 32D. The spool 32A of the first torque control regulator 32 displaces in such a manner as to balance an urging force (hydraulic force) of each of the pressure receiving chambers 32B, 32C, 32D and a spring force of the spring 32E. For example, in a case where the urging force of each of the pressure receiving chambers 32B, 32C, 32D is smaller than the spring force, the spool 32A displaces in the right direction in the figure to lower the pressurized oil in the large diameter side pressure receiving chamber 31C of the first tilting actuator 31 to the output pressure of the first flow rate control regulator 33.

If the output pressure of the first flow rate control regulator 33 is the tank pressure, the pressurized oil in the large diameter side pressure receiving chamber 31C in the first tilting actuator 31 is discharged to the hydraulic oil tank 17. Thereby, the control piston 31A displaces in a direction of increasing the tilting amount (in the right direction in the figure), and the tilting amount of the first main hydraulic pump 14 is feed-backed through the rod to the first torque control regulator 32. Therefore, the tilting is controlled in response to the spool 32A in the first torque control regulator 32.

In addition, in a case where the output pressure of the first flow rate control regulator 33 is the constant pilot pressure Pip, the pressurized oil in the large diameter side pressure receiving chamber 31C in the first tilting actuator 31 becomes the pilot pressure Pip as similar to a case where all the operating devices 8A to 8E2 are in the neutral position. Therefore, the control piston 31A moves in the left direction in the figure, that is, in a direction of decreasing the tilting of the first main hydraulic pump 14 by a difference in a pressure receiving area between the large diameter side pressure receiving chamber 31C and the small diameter side pressure receiving chamber 31B. In this way, since the first flow rate control regulator 33 is disposed upstream of the first torque control regulator 32, the first torque control regulator 32 operates to perform the torque control within a range of a flow rate upper limit value limited by the output pressure of the first flow rate control regulator 33.

Meanwhile, since the lever/pedal operating devices 8A, 8B for left side and right side traveling are not operated, the tank pressures are outputted as Tr1, Tr2, Tr3, Tr4 from the pilot valves in the lever/pedal operating devices 8A, 8B for left side and right side traveling. Therefore, the tank pressure is led through the shuttle valves 29A, 29B, 29N to the hydraulic pilot part 48D of the switching valve 48, and the switching valve 48 is held in the neutral position (A) by the spring. In addition, the pressure sensor 46 for travel operation detection detects the tank pressure as the maximum output pressure of the pilot pressures outputted from the lever/pedal operating devices 8A, 8B for traveling, which is inputted to the controller 47.

At this time, since the switching valve 48 is in the neutral position (A), the output pressure of the second torque control proportional electromagnetic valve 38 is led through the second torque control line 42 to the third pressure receiving chamber 35D in the second torque control regulator 35 in the second main hydraulic pump 15-side. That is, the second flow rate control regulator 36 and the second torque control regulator 35 in the second main hydraulic pump 15-side operate as similar to the first flow rate control regulator 33 and the first torque control regulator 32 in the first main hydraulic pump 14-side. In this way, at the boom raising single operation (at the non-travel operation), the flow rate of the first main hydraulic pump 14 can be controlled by the first flow rate control proportional electromagnetic valve 39, and the torque of the first main hydraulic pump 14 can be controlled by the first torque control proportional electromagnetic valve 37. In addition, the flow rate of the second main hydraulic pump 15 can be controlled by the second flow rate control proportional electromagnetic valve 40, and the torque of the second main hydraulic pump 15 can be controlled by the second torque control proportional electromagnetic valve 38. Thereby, for example, as described in Patent Document 1 and Patent Document 2 the flow rate and/or the torque of each of the main hydraulic pumps 14, 15 can be optimally controlled in response to the operation of each of the operating devices 8C to 8E2.

(3) Case where the Lever/Pedal Operating Devices 8A, 8B for Left Side and Right Side Traveling are Operated For example, when a straight travel operation of the lever/pedal operating devices 8A, 8B for left side and right side traveling (the same amount operation, for example, a full operation of the left and right side lever/pedals) is performed, a pressure in accordance with an operating amount of the lever/pedal is outputted from each of the lever/pedal operating devices 8A, 8B for left side and right side traveling (a pilot valve thereof). Here, it is assumed to consider a case of performing a tilting operation of each of the lever/pedal operating devices 8A, 8B for left side and right side traveling to the left side in the figure, that is, a case where one pilot valve (in the left side in the figure) of each of the operating devices 8A, 8B is subjected to a force in the lower direction and a pilot pressure in response to the operation is outputted as Tr1 and Tr3.

In the left side pilot valve of the lever/pedal operating device 8B for right side traveling, a pilot pressure in accordance with the operating amount of the lever/pedal is supplied to the hydraulic pilot part (left side hydraulic pilot part in the figure) of the directional control valve 28A for right side traveling motor as the right side traveling motor operating pressure Tr3. In the left side pilot valve of the lever/pedal operating device 8A for left side traveling, a pilot pressure in accordance with the operating amount of the lever/pedal is supplied to the hydraulic pilot part (left side pilot part in the figure) of the directional control valve 28I for left side traveling motor as the left side traveling motor operating pressure Tr1. Consequently, the directional control valve 28A for right side traveling motor (a spool thereof) and the directional control valve 28I for left side traveling motor (a spool thereof) are switched in the right direction in the figure.

The pressurized oil delivered from the first main hydraulic pump 14 is led through the first main delivery line 18 and the first center bypass line 19 to the directional control valve 28A for right side traveling motor. When the directional control valve 28A for right side traveling motor is switched, the first center bypass line 19 is cut off. The pressurized oil delivered from the first main hydraulic pump 14 is supplied to the hydraulic motor 2C for right side traveling. Thereby, the hydraulic motor 2C for right side traveling rotates in one direction. The pressurized oil delivered from the second main hydraulic pump 15 is led through the second main delivery line 20 and the second center bypass line 21 to the directional control valve 28I for left side traveling motor. When the directional control valve 28I for left side traveling motor is switched, the second center bypass line 21 is cut off, and the pressurized oil delivered from the second main hydraulic pump 15 is supplied to the hydraulic motor 2B for left side traveling. Thereby, the hydraulic motor 2B for left side traveling rotates in one direction.

Meanwhile, a higher pressure of the right side traveling motor operating pressure Tr3 and the left side traveling motor operating pressure Tr1 is selected through the shuttle valves 29A, 29B, 29N, and the maximum pressure is led to the switching valve 48 to switch the switching valve 48 to the switching position (B). In this case, an output pressure of the first torque control proportional electromagnetic valve 37 is led through the main line 41A of the first torque control line 41 to the third pressure receiving chamber 32D in the first torque control regulator 32. Along with this, the output pressure of the first torque control proportional electromagnetic valve 37 is led through the main line 41A and the branch line 41B in the first torque control line 41, the switching valve 48 and the regulator side line 42B of the second torque control line 42 to the third pressure receiving chamber 35D in the second torque control regulator 35 as well.

The operations of the first and second flow rate control regulators 33, 36, and the first and second torque control regulators 32, 35 are basically the same as in a case of the boom raising operation as described above, but the case of operating the lever/pedal operating devices 8A, 8B for left side and right side traveling, differs in a point where the torque control command pressure is an output pressure of the first torque control proportional electromagnetic valve 37 as described above. Thereby, even when there is a difference between the output of the first torque control proportional electromagnetic valve 37 and the output of the second torque control proportional electromagnetic valve 38, in the case of operating the lever/pedal operating devices 8A, 8B for left side and right side traveling, it is possible to suppress a difference between the delivery flow rate of the first main hydraulic pump 14 and the delivery flow rate of the second main hydraulic pump 15 from occurring.

Figure 12:
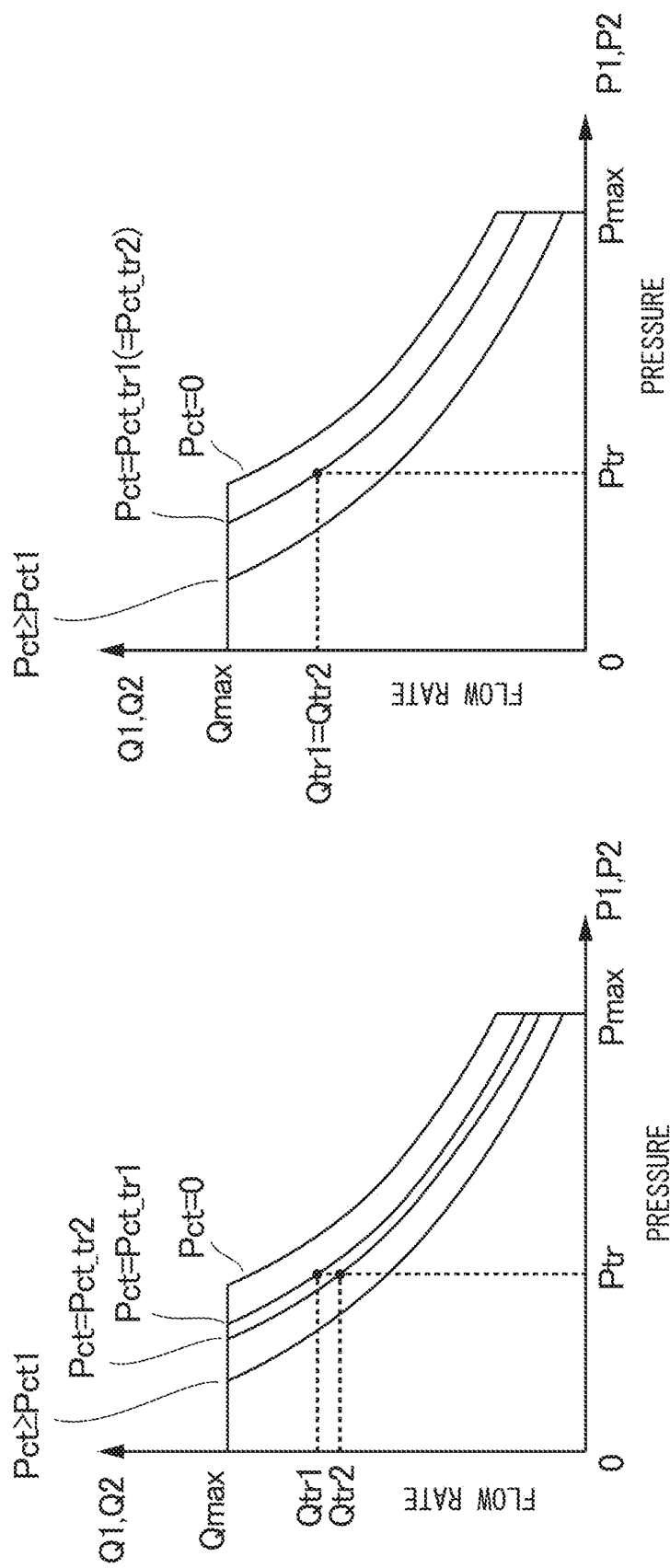
FIG. 12 is a characteristic diagram showing an example of "pump P-Q characteristic in (X) comparative example" and "pump P-Q characteristic in (Y) embodiment" in a case of performing torque control.
Figure 15:
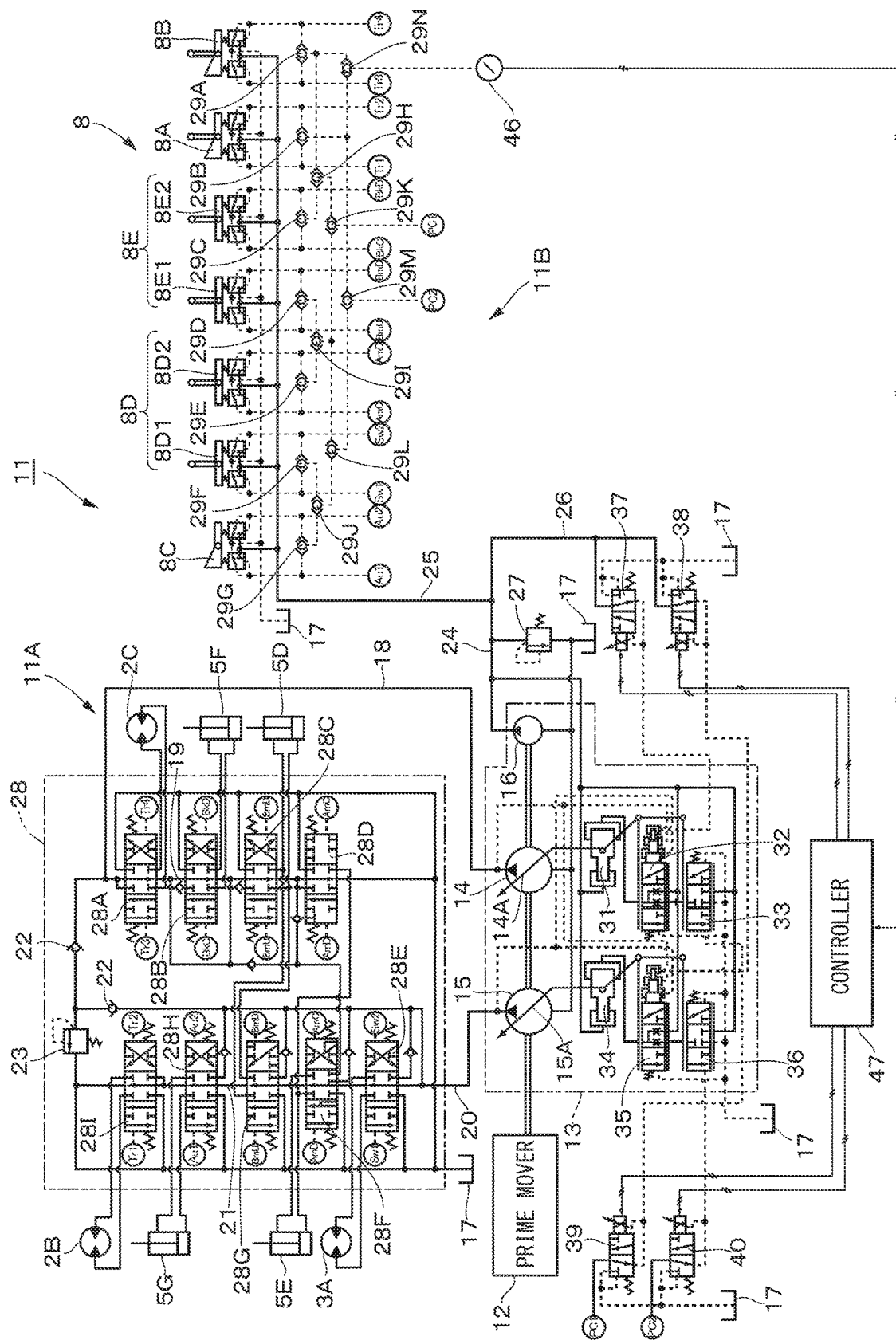
FIG. 15 is a hydraulic circuit diagram of a hydraulic excavator according to a comparative example.

For example, a comparative example shown in FIG. 15 is not provided with the switching valve 48. Here, there will be considered a case of outputting the same command value (command signal) to both of the first torque control proportional electromagnetic valve 37 and the second torque control proportional electromagnetic valve 38 from the controller 47. In this case, as shown in (X) in FIG. 12, there is a possibility that even when the same command value is outputted, there occurs a difference between the output of the first torque control proportional electromagnetic valve 37 and the output of the second torque control proportional electromagnetic valve 38 following an individual difference (so-called variations) of the proportional electromagnetic valves 37, 38 (Pct_tr1≠Pct_tr2). In the comparative example, when a pump load pressure of the travel operation is indicated at Ptr, a delivery flow rate of the first main hydraulic pump 14 is indicated at Qtr1 and a delivery flow rate of the second main hydraulic pump 15 is indicated at Qtr2, there is a possibility that Qtr1≠Qtr2. That is, there is a possibility that there occurs a difference between the delivery flow rate Qtr1 of the first main hydraulic pump 14 and the delivery flow rate Qtr2 of the second main hydraulic pump 15. On the other hand, as shown in (Y) in FIG. 12, according to the first embodiment, the torque control pressure of the first main hydraulic pump 14 and the torque control pressure of the second main hydraulic pump 15 both become Pct_tr1. Therefore, the difference between the delivery flow rate Qtr1 of the first main hydraulic pump 14 and the delivery flow rate Qtr2 of the second main hydraulic pump 15 can be suppressed from occurring at the traveling time (for example, Qtr1=Qtr2 is made possible).

In this way, according to the first embodiment, the switching valve 48 is provided to supply the output pressure of the first torque control proportional electromagnetic valve 37 to the third pressure receiving chamber 35D of the second torque control regulator 35. Therefore, at the traveling time by the hydraulic motors 2B, 2C for left side and right side traveling, it is possible to supply the output pressure of the first torque control proportional electromagnetic valve 37 to both of the first torque control regulator 32 of the first main hydraulic pump 14 and the second torque control regulator 35 of the second main hydraulic pump 15 by the switching valve 48. That is, the same pressure (command pressure) can be led to both of the first torque control regulator 32 and the second torque control regulator 35 by the switching valve 48. Therefore, even if a difference between the output of the first torque control proportional electromagnetic valve 37 and the output of the second torque control proportional electromagnetic valve 38 occurs due to the individual difference (variation), it is possible to suppress the difference between the delivery flow rate of the first main hydraulic pump 14 and the delivery flow rate of the second main hydraulic pump 15 from occurring. As a result, it is possible to suppress the mistracking in the high dimension at the straight traveling time by the hydraulic motor 2C for right side traveling that is driven by the first main hydraulic pump 14 and by the hydraulic motor 2B for left side traveling that is driven by the second main hydraulic pump 15.

According to the first embodiment, at the traveling operation by the hydraulic motors 2B, 2C for left side and right side traveling, it is possible to supply the output pressure of the first torque control proportional electromagnetic valve 37 to both of the first torque control regulator 32 of the first main hydraulic pump 14 and the second torque control regulator 35 of the second main hydraulic pump 15 by the switching valve 48 provided between the first torque control line 41 and the second torque control line 42. That is, the output pressure of the first torque control proportional electromagnetic valve 37 can be supplied through the first torque control line 41 to the first torque control regulator 32, and can be supplied through the first torque control line 41, the switching valve 48 and the second torque control line 42 to the second torque control regulator 35. Thereby, the same pressure (command pressure) can be led to both of the first torque control regulator 32 and the second torque control regulator 35. As a result, it is possible to suppress the difference between the delivery flow rate of the first main hydraulic pump 14 and the delivery flow rate of the second main hydraulic pump 15 from occurring, and it is possible to suppress the mistracking at the straight traveling in the high dimension.

According to the first embodiment, at the traveling operation by the hydraulic motors 2B, 2C for left side and right side traveling, the switching valve 48 cuts off the connection between the second torque control proportional electromagnetic valve 38 and the third pressure receiving chamber 35D in the second torque control regulator 35, and connects the first torque control proportional electromagnetic valve 37 to both of the third pressure receiving chamber 32D in the first torque control regulator 32 and the third pressure receiving chamber 35D in the second torque control regulator 35. Therefore, the output pressure of the first torque control proportional electromagnetic valve 37 based upon the command signal (command value) from the controller 47 is supplied to both of the third pressure receiving chamber 32D in the first torque control regulator 32 and the third pressure receiving chamber 35D in the second torque control regulator 35 (the same command pressure can be led to both of the regulators 32, 35). As a result, it is possible to suppress the difference between the delivery flow rate of the first main hydraulic pump 14 and the delivery flow rate of the second main hydraulic pump 15, and it is possible to suppress the mistracking at the straight traveling operation in the high dimension.

Figure 6:
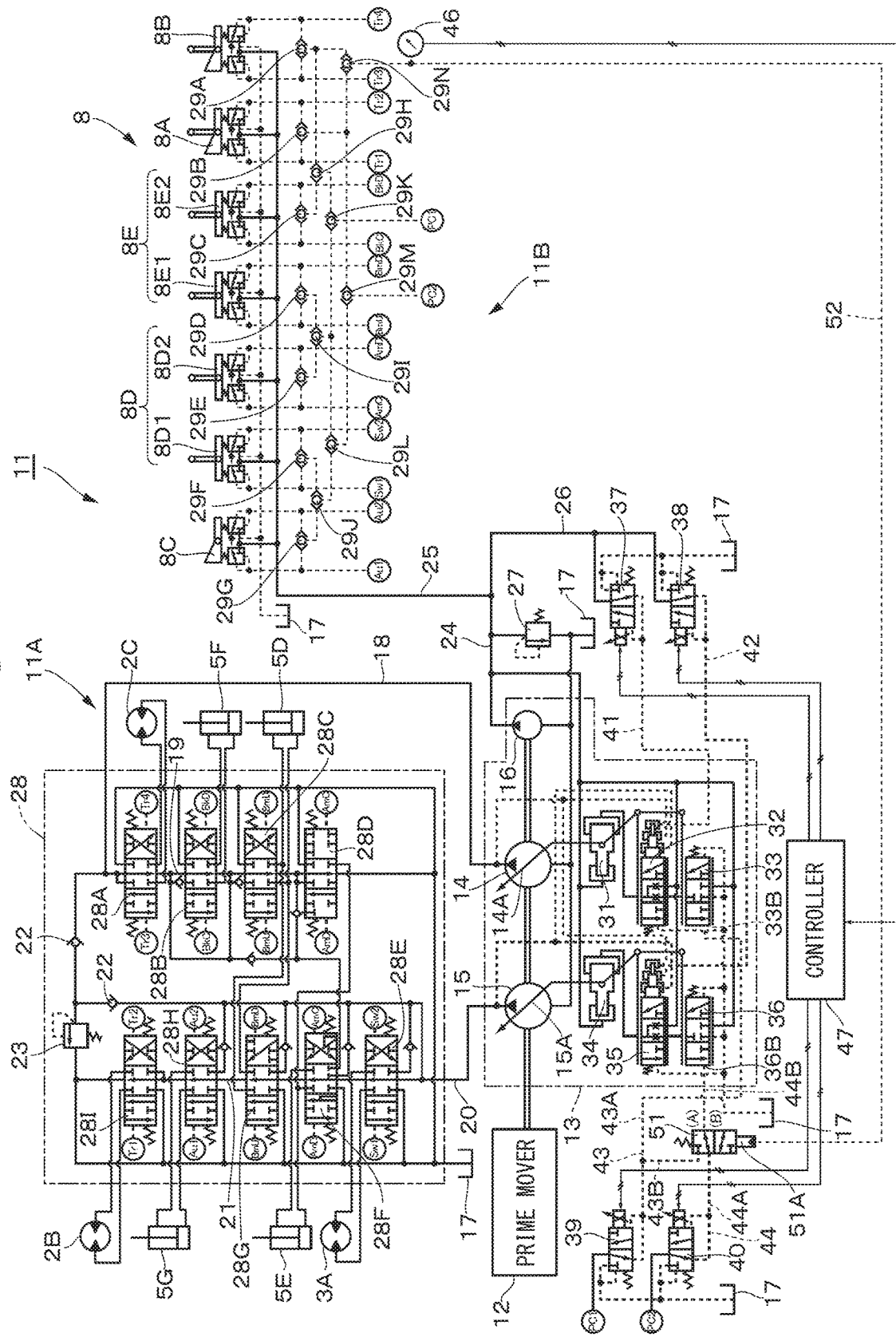
FIG. 6 is a hydraulic circuit diagram of a hydraulic excavator according to a second embodiment.

Next, FIG. 6 shows a second embodiment. The second embodiment is characterized in that a switching valve is provided between a first flow rate control line and a second flow rate control line. It should be noted that in the second embodiment, components identical to those in the aforementioned first embodiment are referred to as identical reference numerals, and an explanation thereof is omitted.

In the aforementioned first embodiment, the switching valve 48 is provided between the first torque control line 41 and the second torque control line 42. On the other hand, in the second embodiment, the switching valve 48 in the first embodiment is omitted, and a switching valve 51 is provided between the first flow rate control line 43 and the second flow rate control line 44. That is, in the second embodiment the first flow rate control line 43 is a first oil passage that is provided between the first flow rate control proportional electromagnetic valve 39 and the first pressure receiving chamber 33B in the first flow rate control regulator 33. The second flow rate control line 44 is a second oil passage that is provided between the second flow rate control proportional electromagnetic valve 40 and the first pressure receiving chamber 36B in the second flow rate control regulator 36. In this case, the first flow rate control proportional electromagnetic valve 39 corresponds to a first proportional electromagnetic valve, the first flow rate control regulator 33 corresponds to a first regulator, the second flow rate control proportional electromagnetic valve 40 corresponds to a second proportional electromagnetic valve and the second flow rate control regulator 36 corresponds to a second regulator.

The first flow rate control line 43 is configured by a main line 43A and a branch line 43B. The second flow rate control line 44 is configured by an electromagnetic valve side line 44A and a regulator side line 44B. The switching valve 51 is provided between the branch line 43B of the first flow rate control line 43 and the regulator side line 44B of the second flow rate control line 44, and is provided between the electromagnetic valve side line 44A and the regulator side line 44B in the second flow rate control line 44. The switching valve 51 in the second embodiment supplies the output pressure of the first flow rate control proportional electromagnetic valve 39 to the first pressure receiving chamber 36B in the second flow rate control regulator 36 at the time of driving at least any one of the hydraulic motors 2B, 2C for left side and right side traveling.

Therefore, the switching valve 51 is, as similar to the switching valve 48 in the first embodiment, configured by a hydraulic pilot switching valve having three ports and two positions. A hydraulic pilot part 51A in the switching valve 51 is connected through a switching pilot line 52 to the shuttle valve 29N. Accordingly, the switching valve 51 is switched from a neutral position (A) to a switching position (B) when the pilot pressure is supplied to the hydraulic pilot part 51A by operating at least one of the lever/pedal operating devices 8A, 8B for left side and right side traveling from a state where both of them are not operated.

That is, when the right side travel operating pressure Tr3 and the left side travel operating pressure Tr1 are outputted from the lever/pedal operating devices 8A, 8B for left side and right side traveling, a higher pressure of the operating pressures Tr3, Tr1 is selected through the shuttle valves 29A, 29B, 29N, and the maximum pressure is led to the switching valve 51. Thereby, the switching valve 51 is switched to the switching position (B). In this case, the output pressure of the first flow rate control proportional electromagnetic valve 39 is led through the main line 43A of the first flow rate control line 43 to the first pressure receiving chamber 33B in the first flow rate control regulator 33. Along with this, the output pressure of the first flow rate control proportional electromagnetic valve 39 is led through the main line 43A and the branch line 43B of the first flow rate control line 43, the switching valve 51 and the regulator side line 44B of the second flow rate control line 44 to the first pressure receiving chamber 36B in the second flow rate control regulator 36.

The operations of the first and second flow rate control regulators 33, 36, and the first and second torque control regulators 32, 35 are basically the same as in a case of the boom raising operation in the first embodiment as described above. However, the case of operating the lever/pedal operating devices 8A, 8B for left side and right side traveling differs because of a point where the flow rate control command pressure is the output pressure of the first flow rate control proportional electromagnetic valve 39 as described above. Thereby, even when there is a difference between the output of the first flow rate control proportional electromagnetic valve 39 and the output of the second flow rate control proportional electromagnetic valve 40, in a case of operating the lever/pedal operating devices 8A, 8B for left side and right side traveling, it is possible to suppress a difference between the delivery flow rate of the first main hydraulic pump 14 and the delivery flow rate of the second main hydraulic pump 15 from occurring.

Figure 13:
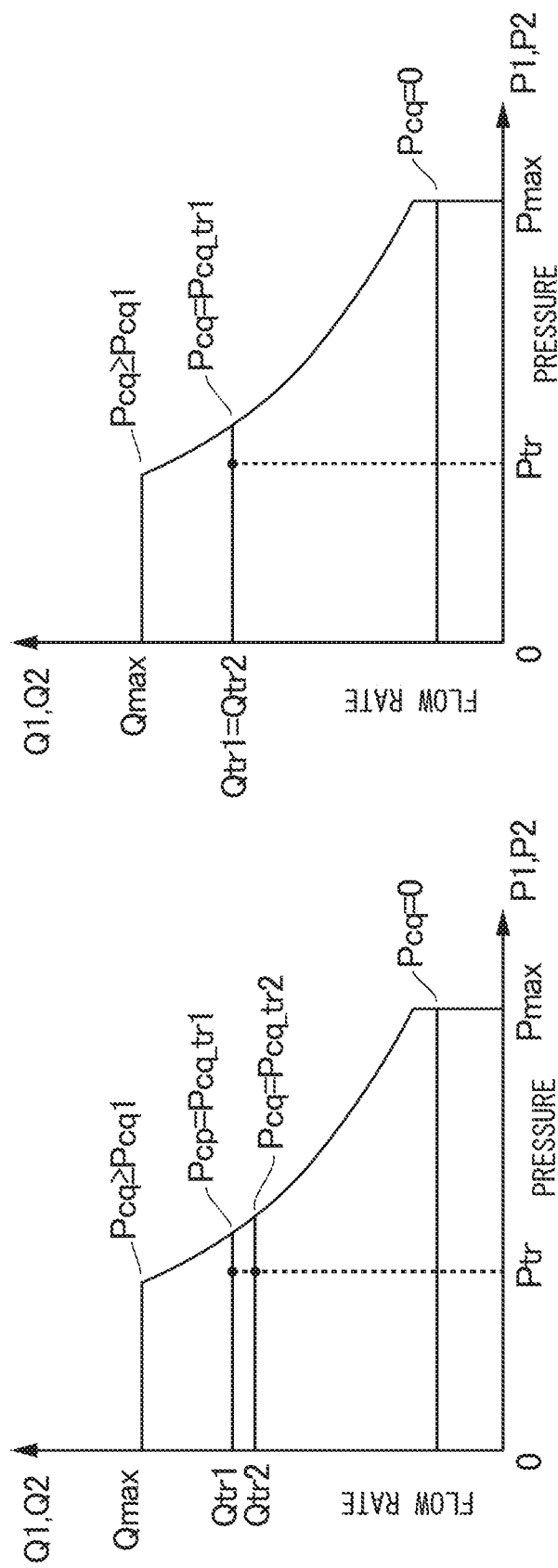
FIG. 13 is a characteristic diagram showing an example of "pump P-Q characteristic in (X) comparative example" and "pump P-Q characteristic in (Y) embodiment" in a case of performing flow rate control.

That is, according to the comparative example, as shown in (X) in FIG. 13, there is a possibility that there occurs a difference (Qtr1≠Qtr2) between the delivery flow rate Qtr1 of the first main hydraulic pump 14 and the delivery flow rate Qtr2 of the second main hydraulic pump 15 following the difference (Pcq_tr1≠Pcq_tr2) between the output of the first flow rate control proportional electromagnetic valve 39 and the output of the second flow rate control proportional electromagnetic valve 40. On the other hand, as shown in (Y) in FIG. 13, according to the second embodiment, the flow rate control pressure of the first main hydraulic pump 14 and the flow rate control pressure of the second main hydraulic pump 14 both become Pcq_tr1. Therefore, the difference between the delivery flow rate Qtr1 of the first main hydraulic pump 14 and the delivery flow rate Qtr2 of the second main hydraulic pump 15 can be suppressed from occurring (for example, Qtr1=Qtr2 is made possible).

The second embodiment is configured such that, when the lever/pedal operating devices 8A, 8B for left side and right side traveling are operated by the aforementioned switching valve 51, the output pressure of the first flow rate control proportional electromagnetic valve 39 is supplied to both of the first flow rate control regulator 33 and the second flow rate control regulator 36, and a basic function of the second embodiment is not particularly different from that of the aforementioned first embodiment. That is, the second embodiment also can suppress the mistracking in the high dimension at the straight traveling operation by the hydraulic motor 2C for right side traveling that is driven by the first main hydraulic pump 14 and the hydraulic motor 2B for left side traveling that is driven by the second main hydraulic pump 15, as it is in the first embodiment.

It should be noted that although omitted in illustration, the switching valve 48 in the first embodiment and the switching valve 51 in the second embodiment both may be provided. That is, the switching valve 48 may be provided between the first torque control line 41 and the second torque control line 42, and further, the switching valve 51 may be provided between the first flow rate control line 43 and the second flow rate control line 44. In this case, a switching pilot line (not shown) may be configured to connect the shuttle valve 29N to both of the hydraulic pilot part 48D of the switching valve 48 and the hydraulic pilot part 51A of the switching valve 51.

Figure 7:
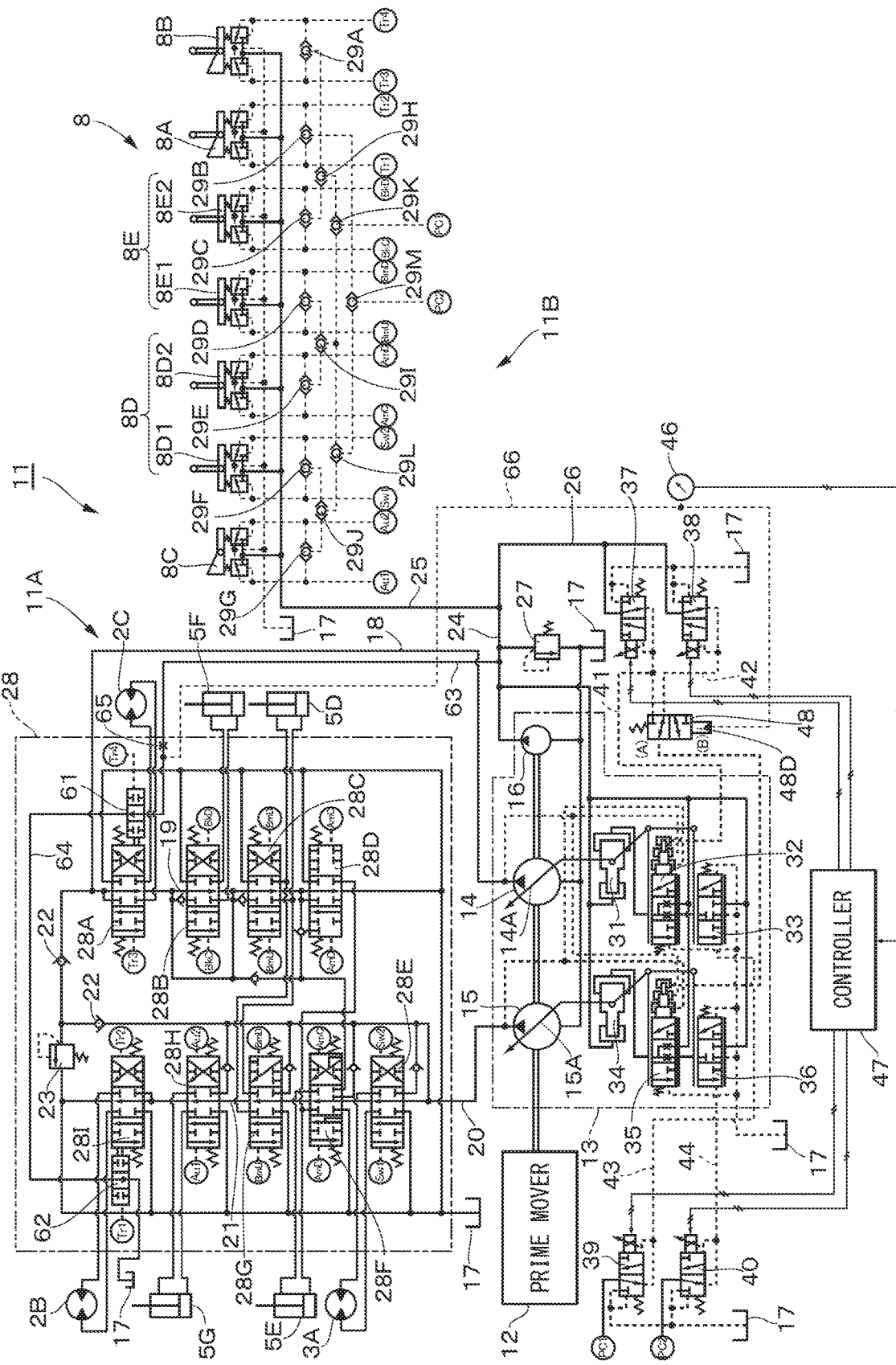
FIG. 7 is a hydraulic circuit diagram of a hydraulic excavator according to a third embodiment.
Figure 8:
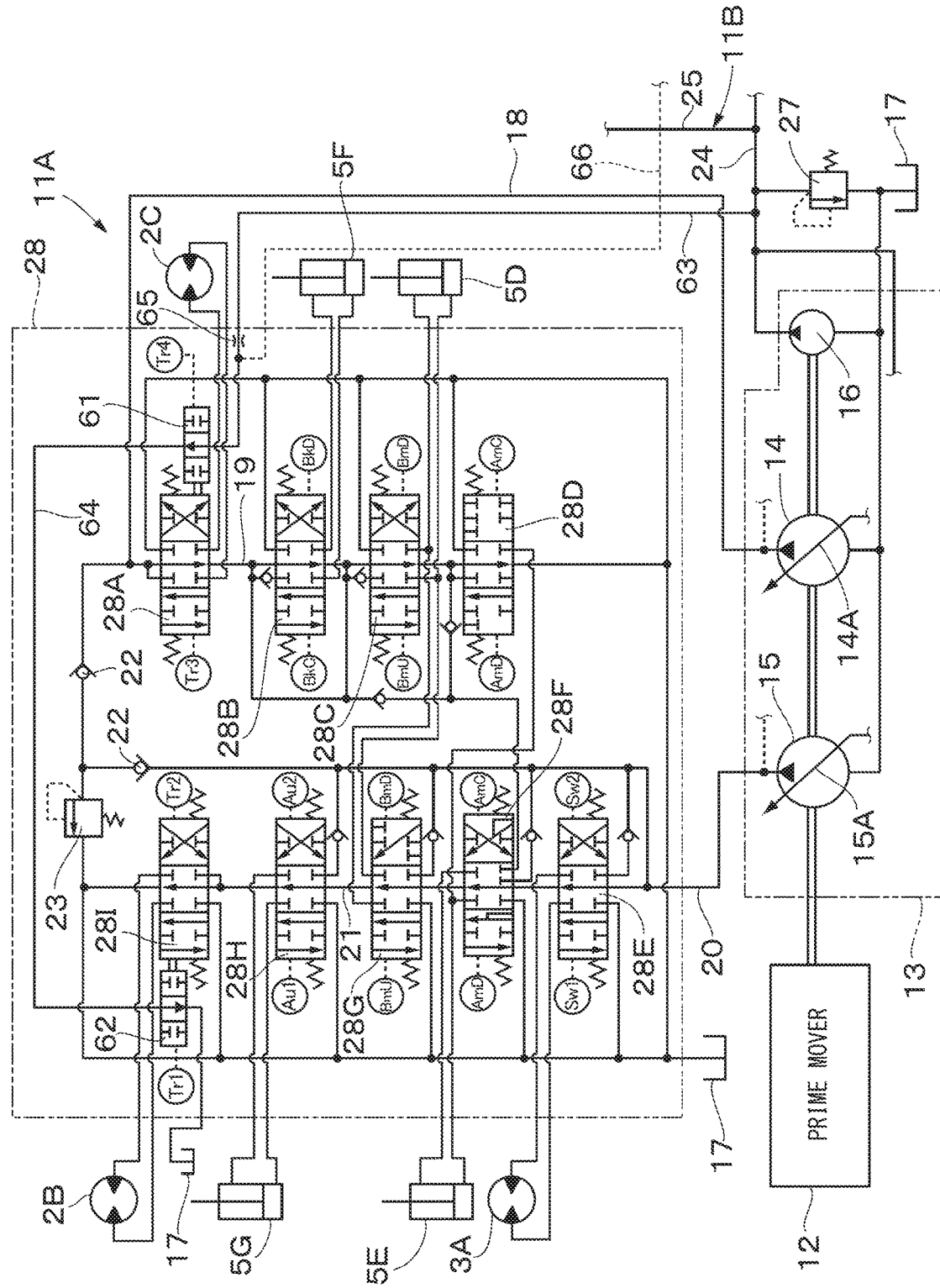
FIG. 8 is an enlarged hydraulic circuit diagram showing a main hydraulic circuit in FIG. 7.

Next, FIG. 7 and FIG. 8 show a third embodiment. The third embodiment is characterized in that a pilot pressure based upon the switching of a directional control valve for traveling motor in a control valve device is supplied to a hydraulic pilot part of a switching valve. It should be noted that in the third embodiment, components identical to those in the aforementioned first embodiment are referred to as identical reference numerals, and an explanation thereof is omitted.

The first and second embodiments adopt the configuration of detecting the pilot pressure of the lever/pedal operating devices 8A, 8B for left side and right side traveling as means for detecting the travel operation (that the hydraulic motors 2B, 2C for left side and right side traveling are driven). That is, for detecting the travel operation to switch the switching valve 48, the higher pilot pressure of the lever/pedal operating devices 8A, 8B for left side and right side traveling selected through the shuttle valves 29A, 29B, 29N is supplied to the hydraulic pilot part 48D of the switching valve 48.

On the other hand, the third embodiment adopts the configuration of detecting the pilot pressure based upon the switching of the directional control valves 28A to 28I for traveling motor in the control valve device 28 as means for detecting the travel operation. That is, for detecting the travel operation to switch the switching valve 48, the pilot pressure based upon the switching of the directional control valves 28A to 28I for traveling motor is supplied to the hydraulic pilot part 48D of the switching valve 48. Therefore, the control valve device 28 is provided with a switching valve 61 for right side travel detection to be switched in association with the directional control valve 28A for right side traveling motor, and a switching valve 62 for left side travel detection to be switched in association with the directional control valve 28I for left side traveling motor.

The switching valves 62, 61 for left side and right side travel detection are connected to a pilot branch line 63 branching from the pilot delivery line 24. In this case, the pilot branch line 63 is connected through the switching valve 61 for right side travel detection, a connecting line 64 for connection between the switching valve 61 for right side travel detection and the switching valve 62 for left side travel detection, and the switching valve 62 for left side travel detection to the hydraulic oil tank 17. Consequently, the constant pilot pressure Pip in the pilot delivery line 24 flows through the pilot branch line 63, an after-described throttle 65, the switching valve 61 for right side travel detection, the connecting line 64 and the switching valve 62 for left side travel detection to the hydraulic oil tank 17.

In addition, the throttle 65 is provided in the halfway of the pilot branch line 63 (upstream of the switching valve 61 for right side travel detection) to form a downstream of the throttle 65 as a signal line. That is, a switching pilot line 66 for connection between the pilot branch line 63 and the hydraulic pilot part 48D in the switching valve 48 is connected to a section of the pilot branch line 63 downstream of the throttle 65 (that is, between the throttle 65 and the switching valve 61 for right side travel detection). The pressure sensor 46 for travel operation detection is provided in the switching pilot line 66 to detect a drive of the hydraulic motors 2B, 2C for left side and right side traveling, that is, the switching of the switching valve 61 for right side travel detection or the switching valve 62 for left side travel detection (operation of the lever/pedal operating devices 8A, 8B for traveling).

The switching valve 61 for right side travel detection is configured by a switching valve having two ports and three positions that is connected to the directional control valve 28A for right side traveling motor, for example. The switching valve 61 for right side travel detection is in an open position (communicating position) for connection between the pilot delivery line 24 (pilot branch line 63) and the connecting line 64 when the directional control valve 28A for right side traveling motor is in a neutral position. The switching valve 61 for right side travel detection is in a closed position (cutoff position) of cutting off connection between the pilot delivery line 24 and the connecting line 64 when the directional control valve 28A for right side traveling motor is switched to any switching position from the neutral position. Meanwhile, the switching valve 62 for left side travel detection also, as similar to the switching valve 61 for right side travel detection, is in an open position (communicating position) for connection between the connecting line 64 and the hydraulic oil tank 17 when the directional control valve 28I for left side traveling motor is in a neutral position. The switching valve 62 for left side travel detection is in a closed position (cutoff position) of cutting off the connection between the connecting line 64 and the hydraulic oil tank 17 when the directional control valve 28I for left side traveling motor is switched from the neutral position.

When the lever/pedal operating devices 8A, 8B for left side and right side traveling are operated, the right-side traveling motor operating pressure Tr3 and the left-side traveling motor operating pressure Tr1 are outputted from the operating devices 8A, 8B. The directional control valves 28A to 28I for left side and right side traveling motor are switched from the neutral position by the traveling motor operating pressures Tr3, Tr1, and the switching valves 61, 62 for left side and right side travel detection are switched in association therewith. When the switching valves 61, 62 for travel detection are switched, the connection between the pilot branch line 63 and the hydraulic oil tank 17 is cut off. Thereby, the downstream pressure of the pilot branch line 63 (signal line downstream of the throttle 65), that is, the pressure upstream of the switching valve 61 for right side travel detection increases to the constant pilot pressure Pip. This pressure is supplied through the switching pilot line 66 to the hydraulic pilot part 48D in the switching valve 48 as a pilot pressure of switching the switching valve 48. Thereby, the switching valve 48 is switched from the neutral position (A) to the switching position (B).

The third embodiment is configured to supply the pilot pressure to the hydraulic pilot part 48D in the switching valve 48 by the switching valves 61, 62 for left and right side travel detection as described above, and a basic function of the third embodiment is not particularly different from that of the aforementioned first embodiment. That is, the third embodiment also can suppress, as similar to the first embodiment, the mistracking in the high dimension at the straight traveling operation by the hydraulic motors 2B, 2C for left side and right side traveling. It should be noted that although omitted in illustration, in addition to the switching valve 48, the switching valve 51 in the second embodiment may be provided between the first flow rate control line 43 and the second flow rate control line 44. In this case, the switching pilot line (not shown) may be configured to connect the halfway of the pilot branch line 63 (between the throttle 65 and the switching valve 61 for right side travel detection) to both of the hydraulic pilot part 48D of the switching valve 48 and the hydraulic pilot part 51A of the switching valve 51.

Figure 9:
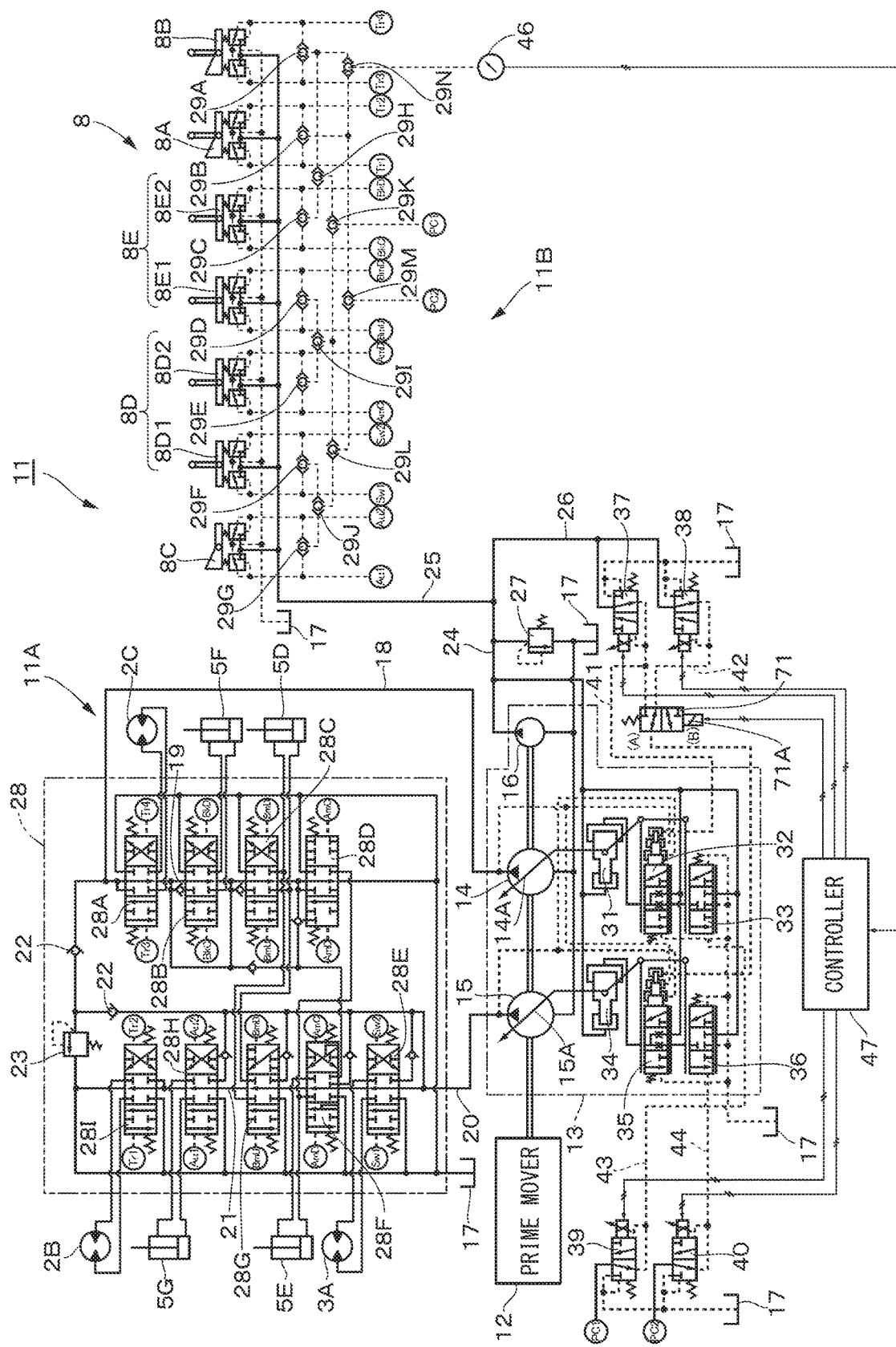
FIG. 9 is a hydraulic circuit diagram of a hydraulic excavator according to a fourth embodiment.
Figure 10:
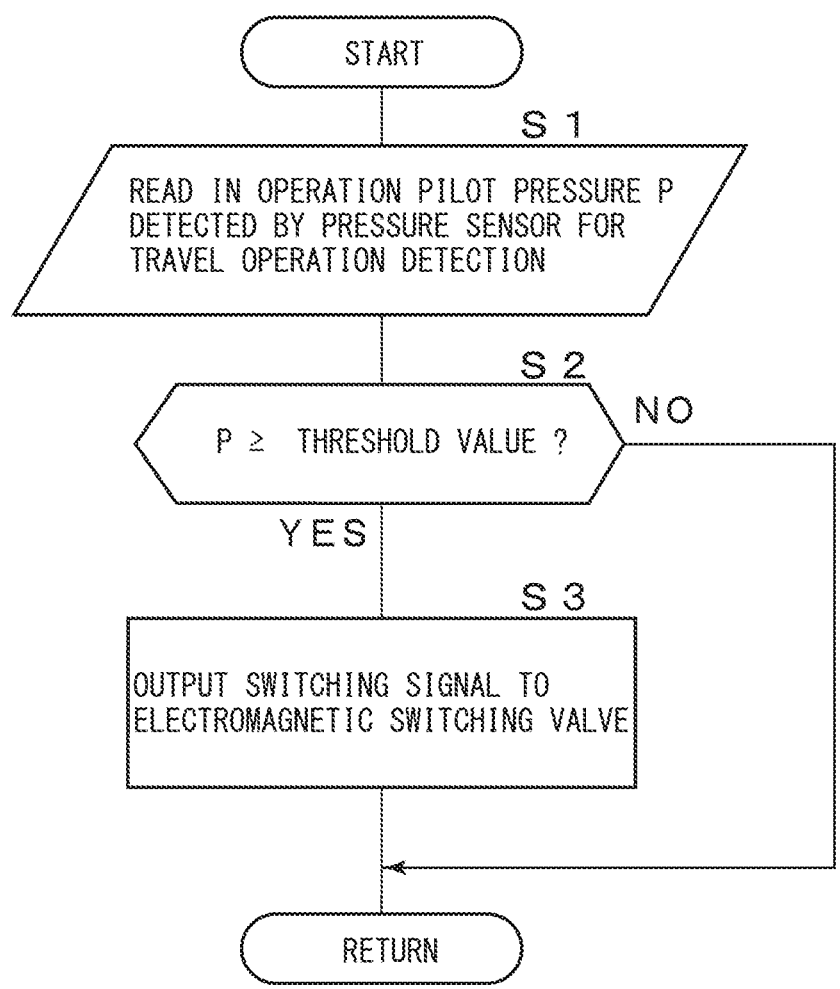
FIG. 10 is a flow chart showing processing by a controller in FIG. 9.

Next, FIG. 9 and FIG. 10 show a fourth embodiment. The fourth embodiment is characterized in that a switching valve is configured by an electromagnetic switching valve. It should be noted that in the fourth embodiment, components identical to those in the aforementioned first embodiment are referred to as identical reference numerals, and an explanation thereof is omitted.

In the first to third embodiments, the switching valves 48, 51 each are configured by a hydraulic pilot switching valve. On the other hand, in the fourth embodiment, a switching valve 71 is configured by an electromagnetic pilot switching valve, that is, an electromagnetic solenoid switching valve. In this case, an electromagnetic pilot part 71A of the switching valve 71 is connected to the controller 47. That is, the switching valve 71 is switched from a neutral position (A) to a switching position (B) in response to a command (supply of power) from the controller 47. For example, a program that is used in control processing of the switching valve 71 (for example, processing program for executing a processing flow shown in FIG. 10) is stored in a memory of the controller 47. In addition, the controller 47 is connected to the pressure sensor 46 for travel operation detection.

In the fourth embodiment, when the lever/pedal operating devices 8A, 8B for left side and right side traveling are operated, the right-side traveling motor operating pressure Tr3 and the left-side traveling motor operating pressure Tr1 are outputted from the operating devices 8A, 8B. A higher pressure of the right-side traveling motor operating pressure Tr3 and the left-side traveling motor operating pressure Tr1 is selected through the shuttle valves 29A, 29B, 29N, and the maximum pressure is detected the pressure sensor 46 for travel operation detection. The pressure (a signal corresponding to the pressure) detected the pressure sensor 46 for travel operation detection is outputted to the controller 47. When the pressure detected by the pressure sensor 46 for travel operation detection pressure reaches more than a preset threshold value, the controller 47 outputs a command (switching signal) to the switching valve 71 to switch the switching valve 71 from the neutral position (A) to the switching position (B).

Next, an explanation will be made of the control processing of the controller 47 with reference to FIG. 10. It should be noted that the control processing in FIG. 10 is repeatedly executed in a specified control cycle while power supply is made to the controller 47. In addition, each step of the flow chart shown in FIG. 10 uses notation of "S" (for example, step 1="S1").

For example, when the control processing (calculation processing) in FIG. 10 is started by the power supply to the controller 47, in S1 the controller 47 reads in the pressure detected by the pressure sensor 46 for travel operation detection, that is, a maximum output pressure P of the pilot pressures outputted from the lever/pedal operating device 8A for left side traveling and the lever/pedal operating device 8B for right side traveling. In subsequent S2, it is determined whether or not the pressure P read in S1 is more than the preset threshold value. The threshold value is set to a determination value (boundary value) that enables an accurate determination on whether or not the lever/pedal operating devices 8A, 8B for left side and right side traveling are operated. In this case, the threshold value is in advance found by experiments, calculations, simulations and the like.

In a case where in S2 determination of "NO" is made, that is, in a case where it is determined that the pressure P read in S1 is not more than the preset threshold value (less than the threshold value), it is determined that the lever/pedal operating devices 8A, 8B for left side and right side traveling are not operated, and the process returns. That is, the process returns to be back to "START", wherein S1 process and the subsequent processes are repeated. On the other hand, in a case where in S2 determination of "YES" is made, that is, in a case where it is determined that the pressure P read in S1 is more than the preset threshold value, it is determined that the lever/pedal operating devices 8A, 8B for left side and right side traveling are operated, and the process goes to S3. In S3 the switching valve 71 is switched to the switching position (B). That is, the controller 47 outputs a command (switching signal) to the switching valve 71 such that the switching valve 71 is switched to the switching position (B). When the switching valve 71 is switched to the switching position (B) in S3, the process returns.

The fourth embodiment is configured such that the switching valve 71 is switched by the aforementioned controller 47, and a basic function of the fourth embodiment is not particularly different from that of the aforementioned first embodiment. That is, the fourth embodiment also can suppress, as similar to the first embodiment, the mistracking in the high dimension at the straight traveling operation by the hydraulic motors 2B, 2C for left side and right side traveling. It should be noted that although omitted in illustration, in addition to the switching valve 71 an electromagnetic pilot switching valve may be provided also between the first flow rate control line 43 and the second flow rate control line 44. In this case, the controller 47 may be configured to output a command (switching signal) to the two switching valves 71 when the travel operation is detected (when the pressure detected by the pressure sensor 46 for travel operation detection is more than the preset threshold value). In addition, without providing the switching valve 71, an electromagnetic pilot switching valve may be provided only between the first flow rate control line 43 and the second flow rate control line 44.

Figure 11:
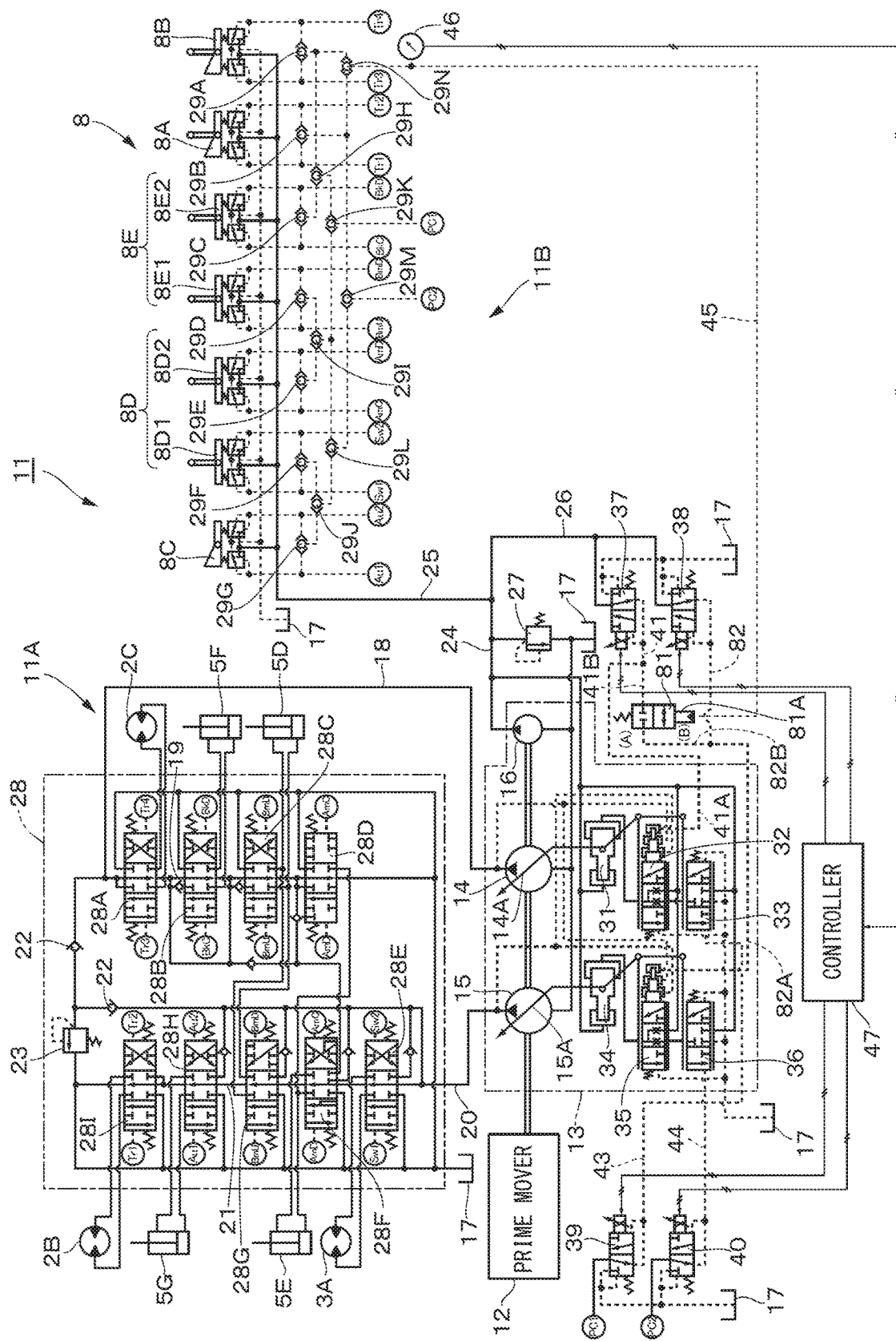
FIG. 11 is a hydraulic circuit diagram of a hydraulic excavator according to a fifth embodiment.

Next, FIG. 11 shows a fifth embodiment. The fifth embodiment is characterized in that a switching valve is configured by a switching valve having two port and two positions. It should be noted that in the fifth embodiment, components identical to those in the aforementioned first embodiment are referred to as identical reference numerals, and an explanation thereof is omitted.

A switching valve 81 in the fifth embodiment is provided instead of the switching valve 48 in the first embodiment. The switching valve 81 is configured by a hydraulic pilot switching valve having two ports and two positions. Here, a second torque control line 82 is configured by a main line 82A establishing connection between the second torque control proportional electromagnetic valve 38 and the second torque control regulator 35, and a branch line 82B branching from the main line 82A. The switching valve 81 is provided between the branch line 41B of the first torque control line 41 and the branch line 82B of the second torque control line 82. The first torque control line 41 is a first oil passage and the second torque control line 82 is a second oil passage.

In this case, one port of the switching valve 81 is connected through the branch line 41B and the main line 41A of the first torque control line 41 to the first torque control proportional electromagnetic valve 37 and the third pressure receiving chamber 32D in the first torque control regulator 32. The other port of the switching valve 81 is connected through the branch line 82B and the main line 82A of the second torque control line 82 to the second torque control proportional electromagnetic valve 38 and the third pressure receiving chamber 35D in the second torque control regulator 35. A hydraulic pilot part 81A of the switching valve 81 is connected through the switching pilot line 45 to the shuttle valve 29N. When a pilot pressure is supplied to the hydraulic pilot part 81A, the switching valve 81 is switched from the neutral position (A) to the switching position (B).

The neutral position (A) is a position of cutting off connection between the first torque control line 41 and the second torque control line 82. When the switching valve 81 is the neutral position (A), the switching valve 81 cuts off between the output of the first torque control proportional electromagnetic valve 37 and the output of the second torque control proportional electromagnetic valve 38. On the other hand, the neutral position (B) is a position of establishing the connection between the first torque control line 41 and the second torque control line 82. At the time of the switching position (B), the output of the first torque control proportional electromagnetic valve 37 is communicated with the output of the second torque control proportional electromagnetic valve 38. As a result, when at least any one of the hydraulic motor 2B for left side traveling and the hydraulic motor 2C for right side traveling is driven, the switching valve 81 is switched to the switching position (B), and thereby the output pressure of the first torque control proportional electromagnetic valve 37 can be supplied to the third pressure receiving chamber 35D in the second torque control regulator 35.

That is, when none of the hydraulic motors 2B, 2C for left side and right side traveling is driven, the switching valve 81 cuts off the connection between the first torque control line 41 and the second torque control line 82. Thereby, when both of the hydraulic motors 2B, 2C for left side and right side traveling are stopped, the output pressure of the first torque control proportional electromagnetic valve 37 is supplied to the third pressure receiving chamber 32D in the first torque control regulator 32. Meanwhile, the output pressure of the second torque control proportional electromagnetic valve 38 is supplied to the third pressure receiving chamber 35D in the second torque control regulator 35.

On the other hand, when at least any one of the hydraulic motors 2B, 2C for left side and right side traveling is driven, the switching valve 81 establishes the connection between the first torque control line 41 and the second torque control line 82. In addition, the controller 47 gives, for example, the same command signal (command value) to the first torque control proportional electromagnetic value 37 and the second torque control proportional electromagnetic valve 38 when a drive of the hydraulic motor 2B (or 2C) for traveling is detected by the pressure sensor 46 for travel operation detection. Thereby, when at least one of the hydraulic motor 2B or 2C for traveling is rotated, both of the output pressure from the first torque control proportional electromagnetic valve 37 and the output pressure from the second torque control proportional electromagnetic valve 38 can be supplied to both of the third pressure receiving chamber 32D in the first torque control regulator 32 and the third pressure receiving chamber 35D in the second torque control regulator 35.

When the lever/pedal operating devices 8A, 8B for left side and right side traveling are operated, the right-side traveling motor operating pressure Tr3 and the left-side traveling motor operating pressure Tr1 are outputted from the operating devices 8A, 8B. A higher pressure of the operating pressures Tr3, Tr1 is selected through the shuttle valves 29A, 29B, 29N, and the maximum pressure is led to the hydraulic pilot part 81A of the switching valve 81, and this pressure is detected by the pressure sensor 46 for travel operation detection. The controller 47 gives the same command signal (command value) to the first torque control proportional electromagnetic valve 37 and the second torque control proportional electromagnetic valve 38 at such a travel operation time, that is, when the travel operation is detected by the pressure sensor 46 for travel operation detection. In addition, when the switching valve 81 is switched from the neutral position (A) to the switching position (B), the output of the first torque control proportional electromagnetic valve 37 is communicated with the output of the second torque control proportional electromagnetic valve 38, which become the same pressure. That is, the command pressure to the third pressure receiving chamber 32D in the first torque control regulator 32 and the command pressure to the third pressure receiving chamber 35D in the second torque control regulator 35 become the same pressure.

The fifth embodiment is configured such that both of the output of the first torque control proportional electromagnetic valve 37 and the output of the second torque control proportional electromagnetic valve 38 are supplied to both of the first torque control regulator 32 and the second torque control regulator 35, and a basic function of the fifth embodiment is not particularly different from that of the aforementioned first embodiment. Particularly, in the fifth embodiment, at the traveling by the hydraulic motors 2B, 2C for left side and right side traveling, the switching valve 81 connects the first torque control line 41 as the first oil passage and the second torque control line 82 as the second oil passage.

Therefore, both of the output pressure of the first torque control proportional electromagnetic valve 37 and the output pressure of the second torque control proportional electromagnetic valve 38 to which the same command signal (command value) are given from the controller 47 are supplied to both of the third pressure receiving chamber 32D in the first torque control regulator 32 and the third pressure receiving chamber 35D in the second torque control regulator 35. That is, by communication of the first torque control line 41 and the second torque control line 82, the same pressure can be led to both of the third pressure receiving chamber 32D in the first torque control regulator 32 and the third pressure receiving chamber 35D in the second torque control regulator 35. As a result, it is possible to suppress a difference between the delivery flow rate of the first main hydraulic pump 14 and the delivery flow rate of the second main hydraulic pump 15 from occurring, and the mistracking at the straight traveling can be suppressed in a high dimension.

It should be noted that although omitted in illustration, in addition to the switching valve 81 an identical switching valve (a switching valve having two ports and two positions) may be provided between the first flow rate control line 43 and the second flow rate control line 44. In addition, a switching valve having two ports and two positions may be provided only between the first flow rate control line 43 and the second flow rate control line without providing the switching valve 81. Further, the switching valve having two ports and two positions may be configured by an electromagnetic pilot switching valve (electromagnetic solenoid switching valve, electromagnetic control valve or ON-OFF electromagnetic valve) that is switched by the controller 47.

Each of the embodiments is explained by taking a case where two hydraulic pumps (main hydraulic pumps 14, 15) are provided to deliver the pressurized oil to the hydraulic actuators, as an example. However, the present invention is not limited thereto, but, for example, three or more hydraulic pumps may be provided to deliver the pressurized oil to the hydraulic actuators.

Each of the embodiments is explained by taking a case where the control of the hydraulic pump (main hydraulic pumps 14, 15) includes both of the torque control and the flow rate control, that is, "the torque control regulators 32, 35 and the torque control proportional electromagnetic valves 37, 38" and "the flow rate control regulators 33, 36 and the flow rate control proportional electromagnetic valves 39, 40" are provided, as an example. However, the present invention is not limited thereto, but, for example, the control of the hydraulic pump may include only any one of the torque control and the flow rate control. For example, the flow rate control regulators 33, 36 and the flow rate control proportional electromagnetic valves 39, 40 may be provided by eliminating the torque control regulators 32, 35 and the torque control proportional electromagnetic valves 37, 38. In addition, the torque control regulators 32, 35 and the torque control proportional electromagnetic valves 37, 38 may be provided by eliminating the flow rate control regulators 33, 36 and the flow rate control proportional electromagnetic valves 39, 40.

Each of the embodiments is explained by taking a case where the drive detecting device includes the pressure sensor 46 for travel operation detection, as an example. Specifically, for example, the first embodiment is explained by taking a case where the drive of each of the hydraulic motors 2B, 2C for traveling is (indirectly) detected by detecting the pilot pressure outputted from each of the lever/pedal operating devices 8A, 8B for traveling by the pressure sensor 46 for travel operation detection. However, the present invention is not limited thereto, but the drive of each of the hydraulic motors 2B, 2C for traveling may be (directly) detected by detecting rotation of each of the hydraulic motors 2B, 2C for traveling by a rotational sensor. In addition, the drive of each of the hydraulic motors 2B, 2C for traveling may be (directly) detected by detecting the pressurized oil supplied to each of the hydraulic motors 2B, 2C for traveling by a pressure sensor.

That is, the present invention may adopt various types of drive detecting devices that can detect the drive of the hydraulic motor for traveling regardless of being directly or indirectly detected. Further, the hydraulic drive apparatus may be configured such that at the time of driving both of one traveling hydraulic motor and the other traveling hydraulic motor, the switching valve is switched. For example, a rotational sensor is provided in each of the hydraulic motors 2B, 2C for traveling, and in a case of detecting the rotation of each of the hydraulic motors 2B, 2C for traveling, when the rotation of each of the hydraulic motors 2B, 2C for traveling is detected by a rotational sensor, the switching valve 71 is switched from a neutral position (A) to a switching position (B) by the controller 47.

Each of the embodiments is explained by taking the hydraulic excavator 1 of an engine type that is driven by the engine 12 as the working machine (construction machine) as an example. However, the present invention is not limited thereto, but the present invention may be applied to a hybrid hydraulic excavator that is driven by an engine and an electric motor, further, an electric hydraulic excavator. In addition, the present invention may be applied widely to various types of working machines including not only crawler type hydraulic excavators but also, such as wheel type hydraulic excavators. Further, each of the embodiments are shown just as examples, and a partial replacement or combination of the configurations shown in the different embodiments is made possible without mentioning.

DESCRIPTION OF REFERENCE NUMERALS

1: Hydraulic excavator (Working machine)
2B: Hydraulic motor for left side traveling (Other traveling hydraulic motor, Hydraulic actuator)
2C: Hydraulic motor for right side traveling (One traveling hydraulic motor, Hydraulic actuator)
3A: Revolving hydraulic motor (Hydraulic actuator)
5D: Boom cylinder (Hydraulic actuator)
5E: Arm cylinder (Hydraulic actuator)
5F: Bucket cylinder (Hydraulic actuator)
5G: Attachment cylinder (Hydraulic actuator)
14: First main hydraulic pump (First hydraulic pump)
14A: First displacement variable part
15: Second main hydraulic pump (Second hydraulic pump)
15A: Second displacement variable part
31: First tilting actuator
32: First torque control regulator (First regulator)
32D: Third pressure receiving chamber (Pressure receiving chamber)
33: First flow rate control regulator (First regulator)
33B: First pressure receiving chamber (Pressure receiving chamber)
34: Second tilting actuator
35: Second torque control regulator (Second regulator)
35D: Third pressure receiving chamber (Pressure receiving chamber)
36: Second flow rate control regulator (Second regulator)
36B: First pressure receiving chamber (Pressure receiving chamber)
37: First torque control proportional electromagnetic valve (First proportional electromagnetic valve)
38: Second torque control proportional electromagnetic valve (Second proportional electromagnetic valve)
39: First flow rate control proportional electromagnetic valve (First proportional electromagnetic valve)
40: Second flow rate control proportional electromagnetic valve (Second proportional electromagnetic valve)
41: First torque control line (First oil passage)
42, 82: Second torque control line (Second oil passage)
43: First flow rate control line (First oil passage)
44: Second flow rate control line (Second oil passage)
46: Pressure sensor for travel operation detection (Drive detecting device)
47: Controller
48, 51, 71, 81: Switching valve

The invention claimed is:

1. A hydraulic drive apparatus comprising:
a displacement variable first hydraulic pump that includes a first displacement variable part and delivers pressurized oil to a plurality of hydraulic actuators including one traveling hydraulic motor;
a first tilting actuator that drives the first displacement variable part to increase/decrease a delivery amount of the pressurized oil to be delivered from the first hydraulic pump;
a first regulator that variably controls a control pressure that is supplied to/discharged from the first tilting actuator;
a first proportional electromagnetic valve that is connected through a first oil passage to a pressure receiving chamber of the first regulator and supplies an output pressure to the pressure receiving chamber of the first regulator;
a displacement variable second hydraulic pump that includes a second displacement variable part and delivers pressurized oil to a plurality of hydraulic actuators including the other traveling hydraulic motor;
a second tilting actuator that drives the second displacement variable part to increase/decrease a delivery amount of the pressurized oil to be delivered from the second hydraulic pump;
a second regulator that variably controls a control pressure that is supplied to/discharged from the second tilting actuator;
a second proportional electromagnetic valve that is connected through a second oil passage to a pressure receiving chamber of the second regulator and supplies an output pressure to the pressure receiving chamber of the second regulator;
a controller configured to control the first proportional electromagnetic valve and the second proportional electromagnetic valve;
a switching valve that supplies the output pressure of the first proportional electromagnetic valve to the pressure receiving chamber of the second regulator at the time of driving at least any one of the one traveling hydraulic motor and the other traveling hydraulic motor, and
a drive detecting device that detects a drive of at least any one of the one traveling hydraulic motor and the other traveling hydraulic motor,
wherein
when none of the one traveling hydraulic motor and the other traveling hydraulic motor are driven, the switching valve cuts off the connection between the first proportional electromagnetic valve and the pressure receiving chamber in the second regulator and establishes the connection between the second proportional electromagnetic valve and the pressure receiving chamber in the second regulator, when at least any one of the one traveling hydraulic motor and the other traveling hydraulic motor is driven, the switching valve cuts off the connection between the second proportional electromagnetic valve and the pressure receiving chamber in the second regulator and connects the first proportional electromagnetic valve to both of the pressure receiving chamber in the first regulator and the pressure receiving chamber in the second regulator, and when the drive of the traveling hydraulic motor is detected by the drive detecting device, the controller gives a command signal to at least the first proportional electromagnetic valve in such a manner as to supply the output pressure from the first proportional electromagnetic valve to both of the pressure receiving chamber in the first regulator and the pressure receiving chamber in the second regulator.

2. The hydraulic drive apparatus according to claim 1, wherein the first oil passage is provided between the first proportional electromagnetic valve and the pressure receiving chamber in the first regulator, the second oil passage is provided between the second proportional electromagnetic valve and the pressure receiving chamber in the second regulator, and the switching valve is provided between the first oil passage and the second oil passage.

3. A hydraulic drive apparatus, comprising:

a displacement variable first hydraulic pump that includes a first displacement variable part and delivers pressurized oil to a plurality of hydraulic actuators including one traveling hydraulic motor;

a first tilting actuator that drives the first displacement variable part to increase/decrease a delivery amount of the pressurized oil to be delivered from the first hydraulic pump;

a first regulator that variably controls a control pressure that is supplied to/discharged from the first tilting actuator;

a first proportional electromagnetic valve that is connected through a first oil passage to a pressure receiving chamber of the first regulator and supplies an output pressure to the pressure receiving chamber of the first regulator;

a displacement variable second hydraulic pump that includes a second displacement variable part and delivers pressurized oil to a plurality of hydraulic actuators including the other traveling hydraulic motor;

a second tilting actuator that drives the second displacement variable part to increase/decrease a delivery amount of the pressurized oil to be delivered from the second hydraulic pump;

a second regulator that variably controls a control pressure that is supplied to/discharged from the second tilting actuator;

a second proportional electromagnetic valve that is connected through a second oil passage to a pressure receiving chamber of the second regulator and supplies an output pressure to the pressure receiving chamber of the second regulator;

a controller configured to control the first proportional electromagnetic valve and the second proportional electromagnetic valve;

a switching valve that supplies the output pressure of the first proportional electromagnetic valve to the pressure receiving chamber of the second regulator at the time of driving at least any one of the one traveling hydraulic motor and the other traveling hydraulic motor, and a drive detecting device that detects a drive of at least any one of the one traveling hydraulic motor and the other traveling hydraulic motor, wherein when none of the one traveling hydraulic motor and the other traveling hydraulic motor are driven, the switching valve cuts off the connection between the first oil passage and the second oil passage, when at least any one of the one traveling hydraulic motor and the other traveling hydraulic motor is driven, the switching valve establishes the connection between the first oil passage and the second oil passage, and when the drive of the traveling hydraulic motor is detected by the drive detecting device, the controller gives the same command signal to the first proportional electromagnetic valve and the second proportional electromagnetic valve in such a manner as to supply both of the output pressure of the first proportional electromagnetic valve and the output pressure of the second proportional electromagnetic valve to both of the pressure receiving chamber in the first regulator and the pressure receiving chamber in the second regulator.

4. The hydraulic drive apparatus according to claim 3, wherein the first oil passage is provided between the first proportional electromagnetic valve and the pressure receiving chamber in the first regulator, the second oil passage is provided between the second proportional electromagnetic valve and the pressure receiving chamber in the second regulator, and the switching valve is provided between the first oil passage and the second oil passage.

\* \* \* \* \*